United States Patent
Wasamoto et al.

(10) Patent No.: US 8,661,270 B2
(45) Date of Patent: Feb. 25, 2014

(54) ELECTRONIC APPARATUS AND METHOD OF CONTROLLING ELECTRONIC APPARATUS

(75) Inventors: Tsuyoshi Wasamoto, Matsumoto (JP); Toshiaki Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 572 days.

(21) Appl. No.: 12/972,020

(22) Filed: Dec. 17, 2010

(65) Prior Publication Data
US 2011/0154077 A1 Jun. 23, 2011

(30) Foreign Application Priority Data

Dec. 17, 2009 (JP) ................................. 2009-285965
Dec. 18, 2009 (JP) ................................. 2009-287306

(51) Int. Cl.
*G06F 1/32* (2006.01)

(52) U.S. Cl.
USPC ........... 713/300; 713/310; 713/320; 713/321; 713/322; 713/323; 713/324; 713/330; 713/340

(58) Field of Classification Search
USPC .................. 713/320–324, 330, 340
See application file for complete search history.

(56) References Cited

U.S. PATENT DOCUMENTS

| | | | |
|---|---|---|---|
| 6,697,678 B2 * | 2/2004 | Miyasaka et al. | 700/9 |
| 7,287,169 B2 * | 10/2007 | Youssef | 713/194 |
| 2004/0073807 A1 * | 4/2004 | Youssef | 713/194 |
| 2008/0001594 A1 * | 1/2008 | Youssef | 324/110 |

FOREIGN PATENT DOCUMENTS

| | | | |
|---|---|---|---|
| JP | 4-138598 A | 5/1992 | |
| JP | 5-120567 A | 5/1993 | |
| JP | 8-161644 A | 6/1996 | |
| JP | 11-185156 A | 7/1999 | |
| JP | 2003-323677 A | 11/2003 | |
| JP | 2008-046954 A | 2/2008 | |
| JP | 2008-242907 A | 10/2008 | |

* cited by examiner

*Primary Examiner* — M Elamin
(74) *Attorney, Agent, or Firm* — Nutter McClennen & Fish LLP; John J. Penny, Jr.; Michael P. Visconti, III

(57) ABSTRACT

An electronic apparatus is provided. A management hoard includes: a control section; a real-time clock that outputs data indicating current date and time to the control section; a memory that stores fiscal data including the data indicating the current date and time and fiscal information under the control of the control section; and a power source that supplies power to the real-time clock through a power supply path. A housing box includes a box main body and a cover. The housing box that houses the management board. When the cover is in a closed state, the power supply path is formed and the power is supplied to the real-time clock. When the cover is placed in an open state, the power supply path is shut off and the power supplied to the real-time clock is shut off.

19 Claims, 13 Drawing Sheets

ELECTRONIC APPARATUS AND METHOD OF CONTROLLING ELECTRONIC APPARATUS

The disclosures of Japanese Patent Application No. 2009-285965 filed on Dec. 17, 2009 and No. 2009-287306 filed on Dec. 18, 2009, including specifications, drawings and claims are incorporated herein by reference in their entireties.

BACKGROUND

The present invention relates to an electronic apparatus which stores data including fiscal information, and a method of controlling an electronic apparatus.

In the related art, an electronic apparatus (an electronic cash register or a receipt printer) is provided in a shop or the like which sells articles or provides services. The electronic apparatus includes a writable nonvolatile memory (fiscal ROM) which stores fiscal information including information regarding sales transactions of articles or the like (information regarding sales or information regarding the tax amount or the like) (for example, see Patent Document 1). The fiscal information stored in the memory is used as, for example, information for ascertaining the actual status of the transactions of the shop when a state institution, such as the government, collects tax from the shop.
Patent Document 1: JP-A-05-120567

As described above, the fiscal information stored in the memory is used as information for ascertaining the actual status of the transactions of the shop. Thus, there is a demand that the electronic apparatus is configured to perform effective processing against falsification of the fiscal information stored in the memory. In some countries, the law requires that the electronic apparatus is necessarily configured to perform effective processing against falsification of the fiscal information stored in the memory.

SUMMARY

It is therefore an object of at least one embodiment of the present invention to provide an electronic apparatus which is capable of performing effective processing against falsification of fiscal information stored in a memory, and a method of controlling an electronic apparatus.

In order to achieve at least one of the above-described objects, according to a first aspect of the embodiments of the present invention, there is provided an electronic apparatus, comprising: a management board including: a control section; a real-time clock that outputs data indicating current date and time to the control section; a memory that stores fiscal data including the data indicating the current date and time and fiscal information under the control of the control section; and a power source that supplies power to the real-time clock through a power supply path; and a housing box including a box main body and a cover, the housing box that houses the management board, wherein when the cover is in a closed state, the power supply path is formed and the power is supplied to the real-time clock; and wherein when the cover is placed in an open state, the power supply path is shut off and the power supplied to the real-time clock is shut off.

With this configuration, when the cover of the housing box is placed in the open state, the power supply to the real-time clock is shut off and the current date and time measured by the real-time clock is erased. For this reason, after the cover of the housing box is placed in the open state, even when the cover of the housing box is again placed in the closed state and power is supplied to the real-time clock, the real-time clock is reset and starts to operate from an initial value. For this reason, data representing the date and time divorced from the actual current date and time is output from the real-time clock to the control section. Thus, taking advantage of the date and time represented by data input from the real-time clock being divorced from the actual date and time, the control section can detect falsification which is done after the cover is placed in the open state, and perform effective processing against falsification, such as stopping the actuation of the electronic apparatus or giving a notification indicating that falsification is likely to have been done. The trace of falsification is retained, making it possible to rapidly and reliably recognize that falsification has been done.

According to a second aspect of the embodiments of the present invention, there is provided an electronic apparatus, comprising: a management board including; a control section; a real-time clock that outputs data indicating current date and time to the control section; a memory that stores fiscal data including the data indicating the current date and time and fiscal information under the control of the control section; a volatile memory that stores data for access to the memory by the control section; and a power source that supplies power to the volatile memory through a power supply path; and a housing box including a box main body and a cover, the housing box that houses the management board, wherein when the cover is in a closed state, the power supply path is formed and the power is supplied to the volatile memory, and wherein when the cover is placed in an open state, the power supply path is shut off and the power supplied to the volatile memory is shut off.

With this configuration, when the cover of the housing box is placed in the open state, the power supply to the volatile memory is shut off, and data stored in the volatile memory is erased. For this reason, after the cover of the housing box is placed in the open state, even when the management board is again attached to the housing box and power is supplied to the volatile memory, normal access to the memory cannot be performed by the control section using data stored in the volatile memory, and on the basis of this situation, the control section can detect falsification which is done after the cover is placed in the open state and can perform effective processing against falsification, such as stopping the actuation of the electronic apparatus or giving a notification indicating that falsification is likely to have been done. The trace of falsification is retained, making it possible to rapidly and reliably recognize that falsification has been done.

According to a third aspect of the embodiments of the present invention, there is provided an electronic apparatus, comprising: a management board including: a control section; a real-time clock that outputs data indicating current date and time to the control section; a memory that stores fiscal data including the data indicating the current date and time and fiscal information under the control of the control section; and a power source that supplies power to the real-time clock through a power supply path; and a housing box in which the management board is housed and attached, wherein when the management board is attached to the housing box, the power supply path is formed and the power is supplied to the real-time clock, and wherein when the management board is detached from the hosing box, the power supply path is shut off and the power supplied to the real-time clock is shut off.

With this configuration, when the management board is detached from the housing box, the power supply to the real-time clock is shut off, and the current date and time measured by the real-time clock is erased. For this reason, after the management board is detached from the housing box, even when the management board is again attached to the housing box and power is supplied to the real-time clock, the real-time clock is reset and starts to operate from an initial value. For this reason, data representing the date and time divorced from the actual current date and time is output from the real-time clock to the control section. Thus, taking advantage of the date and time represented by data input from the real-time clock being divorced from the actual date and time, the control section can detect falsification which is done after the management board is detached from the housing box, and can perform effective processing against falsification, such as stopping the actuation of the electronic apparatus or giving a notification indicating that falsification is likely to have been done. The trace of falsification is retained, making it possible to rapidly and reliably recognize that falsification has been done.

According to a fourth aspect of the embodiments of the present invention, there is provided an electronic apparatus, comprising: a management board including: a control section; a real-time clock that outputs data indicating current date and time to the control section; a memory that stores fiscal data including the data indicating the current date and time and fiscal information under the control of the control section; a volatile memory that stores data for access to the memory by the control section; and a power source that supplies power to the volatile memory through a power supply path; and a housing box in which the management board is housed and attached, wherein when the management board is attached to the housing box, the power supply path is formed and the power is supplied to the volatile memory, and wherein when the management board is detached from the hosing box, the power supply path is shut off and the power supplied to the volatile memory is shut off.

With this configuration, when the management board is detached from the housing box, the power supply to the volatile memory is shut off, and data stored in the volatile memory is erased. For this reason, after the management board is detached from the housing box, even when the management board is again attached to the housing box and power is supplied to the volatile memory, normal access to the memory cannot be performed by the control section using data stored in the volatile memory, and on the basis of this situation, the control section can detect falsification which is done after the cover is placed in the open state, and can perform effective processing against falsification, such as stopping the actuation of the electronic apparatus or giving a notification indicating that falsification is likely to have been done. The trace of falsification is retained, making it possible to rapidly and reliably recognize that falsification has been done.

According to a fifth aspect of the embodiments of the present invention, there is provided an electronic apparatus, comprising: a management board including: a control section; a real-time clock that outputs data indicating current date and time to the control section; a memory that stores fiscal data including the data indicating the current date and time and fiscal information under the control of the control section; and a power source that supplies power to the real-time clock through a power supply path; a printer; and a printer board for the printer, connected to the management board, wherein when the management board and the printer board are connected to each other, the power supply path is formed and the power is supplied to the real-time clock, and wherein when the management board and the printer board are disconnected from each other, the power supply path is shut off and the power supplied to the real-time clock is shut off.

With this configuration, when the management board and the printer board are disconnected from each other, the power supply to the real-time clock is shut off, and the current date and time measured by the real-time clock is erased. For this reason, after the management board and the printer board are disconnected from each other, even when the management board and the printer board are again connected to each other and power is supplied to the real-time clock, the real-time clock is reset and starts to operate from an initial value. For this reason, data representing the date and time divorced from the actual current date and time is output from the real-time clock to the control section. Thus, taking advantage of the date and time represented by data input from the real-time clock being divorced from the actual date and time, the control section can detect falsification which is done after the management board and the printer board are disconnected from each other, and can perform effective processing against falsification, such as stopping the actuation of the electronic apparatus or giving a notification indicating that falsification is likely to have been done. The trace of falsification is retained, making it possible to rapidly and reliably recognize that falsification has been done.

According to a sixth aspect of the embodiments of the present invention, there is provided an electronic apparatus, comprising: a management board including: a control section; a real-time clock that outputs data indicating current date and time to the control section; a memory that stores fiscal data including the data indicating the current date and time and fiscal information under the control of the control section; a volatile memory that stores data for access to the memory by the control section; and a power source that supplies power to the volatile memory through a power supply path; a printer; and a printer board for the printer, connected to the management board, wherein when the management board and the printer board are connected to each other, the power supply path is formed and the power is supplied to the volatile memory, and wherein when the management board and the printer board are disconnected from each other, the power supply path is formed and the power supplied to the volatile memory is shut off.

With this configuration, when the management board and the printer board are disconnected from each other, the power supply to the volatile memory is shut off, and data stored in the volatile memory is erased. For this reason, after the management board and the printer board are disconnected from each other, even when the management board and the printer board are again connected to each other and power is supplied to the volatile memory, normal access to the memory cannot be performed by the control section using data stored in the volatile memory, and on the basis of this situation, the control section can detect falsification which is done after the cover is placed in the open state, and can perform effective processing against falsification, such as stopping the actuation of the electronic apparatus or giving a notification indicating that falsification is likely to have been done. The trace of falsification is retained, making it possible to rapidly and reliably recognize that falsification has been done.

According to a seventh aspect of the embodiment of the present invention, there is provided an electronic apparatus, comprising: a management board including: a control section; a real-time clock that outputs data indicating current date and time to the control section; and a memory that stores fiscal data including the data indicating the current date and time and fiscal information under the control of the control section; a housing box including a box main body and a cover, the housing box that houses the management board; a detection section that detects an open state of the cover; and a reset section that erases the current date and time measured by the real-time clock when the detection section detects the open state of the cover.

With this configuration, when the cover of the housing box is placed in the open state, the current date and time measured by the real-time clock is erased. Erasure may be performed through rewriting or resetting of the real-time clock. For this reason, after the cover of the housing box is placed in the open state, data representing the date and time divorced from the actual current date and time is output from the real-time clock to the control section. Thus, even when the cover of the housing box is again placed in the closed state, the date and time represented by data input from the real-time clock is divorced from the actual date and time. Thus, taking advantage of this situation, the control section can detect falsification which is done after the cover is placed in the open state, and can perform effective processing against falsification, such as stopping the actuation of the electronic apparatus or giving a notification indicating that falsification is likely to have been done. The trace of falsification is retained, making it possible to rapidly and reliably recognize that falsification has been done.

In the above-described electronic apparatus, the management board may further include a power source that supplies power to the real-time clock, and the reset section may shut off the power supplied from the power source to the real-time clock so as to erase the current date and time measured by the real-time clock when the detection section detects the open state of the cover.

With this configuration, when the open state of the cover is detected, power supply to the real-time clock is shut off, thus it is possible to reliably erase or reset the current date and time measured by the real-time clock. The power supply may be performed using a battery.

In the above-described electronic apparatus, a switch which is controlled by the real-time clock may be provided in a power supply path connecting the power source and the real-time clock, when the detection section detects the open state of the cover, the detection section may output a signal indicating the detection of the open state to the real-time clock, and when the signal is input to the real-time clock which functions as the reset section, the real-time clock may control the switch to shut off the power supplied from the power source to the real-time clock.

With this configuration, when the cover is placed in the open state, the power supply to the real-time clock is shut off by the switch which is controlled by the real-time clock. Thus, it is possible to reliably erase or reset the current date and time measured by the real-time clock.

According to an eighth aspect of the embodiments of the present invention, there is provided an electronic apparatus, comprising: a management board including: a control section; a real-time clock that outputs data indicating current date and time to the control section; and a memory that stores fiscal data including the data indicating the current date and time and fiscal information under the control of the control section; a printer; a printer board for the printer, connected to the management board; a detection section that detects that the management board and the printer board are disconnected from each other; and a reset section that erases the current date and time measured by the real-time clock when the detection section detects that the management board and the printer board are disconnected from each other.

With this configuration, when the management board and the printer board are disconnected from each other, the current date and time measured by the real-time clock is erased or reset. For this reason, after the management board and the printer board are disconnected from each other, data representing the date and time divorced from the actual current date and time is output from the real-time clock to the control section. Thus, even when the management board and the printer board are again connected to each other, the date and time represented by data input from the real-time clock is divorced from the actual date and time. Thus, taking advantage of this situation, the control section can detect falsification which is done after the management board and the printer board are disconnected from each other, and can perform effective processing against falsification, such as stopping the actuation of the electronic apparatus or giving a notification indicating that falsification is likely to have been done. The trace of falsification is retained, making it possible to rapidly and reliably recognize that falsification has been done.

According to a ninth aspect of the embodiments of the present invention, there is provided an electronic apparatus, comprising: a management board including: a control section; a real-time clock that outputs data indicating current date and time to the control section; a memory that stores fiscal data including the data indicating the current date and time and fiscal information under the control of the control section; and a volatile memory that stores data for access to the memory by the control section; a housing box including a box main body and a cover, the housing box that houses the management board; a detection section that detects an open state of the cover; and a data erasure section that erases the data stored in the volatile memory when the detection section detects the open state of the cover.

With this configuration, when the cover of the housing box is placed in the open state, data stored in the volatile memory is erased. For this reason, after the cover of the housing box is placed in the open state, normal access to the memory cannot be performed by the control section using data stored in the volatile memory, and on the basis of this situation, the control section can detect falsification which is done after the cover is placed in the open state, and can perform effective processing against falsification, such as stopping the actuation of the electronic apparatus or giving a notification indicating that falsification is likely to have been done. The trace of falsification is retained, making it possible to rapidly and reliably recognize that falsification has been done.

In the above-described electronic apparatus, the management board may further include a power source that supplies power to the volatile memory, and the data erasure section may shut off the power supplied from the power source to the volatile memory so as to erase the data stored in the volatile memory when the detection section detects the open state of the cover.

With this configuration, when the open state of the cover is detected, power to the volatile memory is shut off, making it possible to reliably erase data stored in the volatile memory. The power supply may be performed using a battery.

In the above-described electronic apparatus, a switch which is controlled by the real-time clock may be provided in a power supply path connecting the power source and the volatile memory, when the detection section detects the open state of the cover, the detection section may output a signal indicating the detection of the open state to the real-time clock, and when the signal is input to the real-time clock which functions as the data erasure section, the real-time clock may control the switch to shut off the power supplied from the power source to the volatile memory.

With this configuration, when the cover is placed in the open state, power to the volatile memory is shut off by the switch which is controlled by the real-time clock, making it possible to reliably erase data stored in the volatile memory.

According to a tenth aspect of the embodiments of the present invention, there is provided an electronic apparatus, comprising: a management board including: a control section; a real-time clock that outputs data indicating current date and time to the control section; a memory that stores fiscal data including the data indicating the current date and time and fiscal information under the control of the control section; and a volatile memory that stores data for access to the memory by the control section; a printer; a printer board for the printer, connected to the management board; a detection section that detects that the management board and the printer board are disconnected from each other; and a data erasure section that erases the date stored in the volatile memory when the detection section detects that the management hoard and the printer board are disconnected from each other.

With this configuration, when the management board and the printer board are disconnected from each other, data stored in the volatile memory is erased. For this reason, after the management board and the printer board are disconnected from each other, normal access to the memory cannot be perforated by the control section using data stored in the volatile memory, and on the basis of this situation, the control section can detect falsification which is done after the management board and the printer board are disconnected from each other, and can perform effective processing against falsification, such as stopping the actuation of the electronic apparatus or giving a notification indicating that falsification is likely to have been done. The trace of falsification is retained, making it possible to reliably recognize that falsification has been done.

According to an eleventh aspect of the embodiments of the present invention, there is provided a method of controlling an electronic apparatus which comprises: a management board including: a control section; a real-time clock that outputs data indicating current date and time to the control section; a memory that stores fiscal data including the data indicating the current date and time and fiscal information under the control of the control section; a volatile memory that stores data for access to the memory by the control section; and a power source that supplies power to the real-time clock and the volatile memory; and a housing box including a box main body and a cover, the housing box that houses the management board, the method comprising: when the cover is in a closed state, forming a power supply path to the real-time clock and the volatile memory to supply the power; and when the cover is in an open state, shutting off the power supply path to at least one of the real-time clock and the volatile memory to shut off the power.

With this configuration, when the cover of the housing box is placed in the open state, the power supply to the real-time clock is shut off, and the current date and time measured by the real-time clock is erased, or the power supply to the volatile memory is shut off and data stored in the volatile memory is erased.

It is assumed that the power supply to the real-time clock is shut off and thus the current date and time measured by the real-time clock is erased. In this case, after the cover of the housing box is placed in the open state, even when the cover of the housing box is again placed in the closed state and power is supplied to the real-time clock, the real-time clock is reset and starts to operate from an initial value. For this reason, data representing the date and time divorced from the actual current date and time is output from the real-time clock to the control section. Thus, taking advantage of the date and time represented by data input from the real-time clock being divorced from the actual date and time, the control section can detect falsification which is done after the cover is placed in the open state, and can perform effective processing against falsification, such as stopping the actuation of the electronic apparatus or giving a notification indicating that falsification is likely to have been done. The trace of falsification is retained, making it possible to rapidly and reliably recognize that falsification has been done.

It is assumed that the power supply to the volatile memory is shut off and thus data stored in the volatile memory is erased. In this case, after the cover of the housing box is placed in the open state, even when the management board is again attached to the housing box and power is supplied to the volatile memory, normal access to the memory cannot be performed by the control section using data stored in the volatile memory, and on the basis of this situation, the control section can detect falsification which is done after the cover is placed in the open state, and can perform effective processing against falsification, such as stopping the actuation of the electronic apparatus or giving a notification indicating that falsification is likely to have been done. The trace of falsification is retained, making it possible to rapidly and reliably recognize that falsification has been done.

According to a twelfth aspect of the present invention, there is provided a method of controlling an electronic apparatus which comprises: a management board including: a control section; a real-time clock that outputs data indicating current date and time to the control section; a memory that stores fiscal data including the data indicating the current date and time and fiscal information under the control of the control section; a volatile memory that stores data for access to the memory by the control section; and a power source that supplies power to the real-time clock and the volatile memory; and a housing box in which the management board is housed and attached, the method comprising: when the management board is attached to the housing box, forming the power supply path to the real-time clock and the volatile memory to supply the power; and when the management board is detached from the hosing box, shutting off the power supply path to at least one of the real-time clock and the volatile memory to shut off the power.

With this configuration, when the management board is detached from the housing box, the power supply to the real-time clock is shut off and the current date and time measured by the real-time clock is erased, or the power supply to the volatile memory is shut off and data stored in the volatile memory is erased.

It is assumed that the power supply to the real-time clock is shut off and thus the current date and time measured by the real-time clock is erased. In this case, after the management board is detached from the housing box, even when the management board is again attached to the housing box and power is supplied to the real-time clock, the real-time clock is reset and starts to operate from an initial value. For this reason, data representing the date and time divorced from the actual current date and time is output from the real-time clock to the control section. Thus, taking advantage of the date and time represented by data input from the real-time clock being divorced from the actual date and time, the control section can detect falsification which is done after the management board is detached from the housing box, and can perform effective processing against falsification, such as stopping the actuation of the electronic apparatus or giving a notification indicating that falsification is likely to have been done. The trace of falsification is retained, making it possible to rapidly and reliably recognize that falsification has been done.

It is assumed that the power supply to the volatile memory is shut off and thus data stored in the volatile memory is erased. In this case, after the management board is detached from the housing box, even when the management board is again attached to the housing box and power is supplied to the volatile memory, normal access to the memory cannot be performed by the control section using data stored in the volatile memory, and on the basis of this situation, the control section can detect falsification which is done after the cover is placed in the open state, and can perform effective processing against falsification, such as stopping the actuation of the electronic apparatus or giving a notification indicating that falsification is likely to have been done. The trace of falsification is retained, making it possible to rapidly and reliably recognize that falsification has been done.

According to a thirteenth aspect of the embodiment of the present invention, there is provided a method of controlling an electronic apparatus which comprises; a management board including: a control section; a real-time clock that outputs data indicating current date and time to the control section; a memory that stores fiscal data including the data indicating the current date and time and fiscal information under the control of the control section; a volatile memory that stores data for access to the memory by the control section; and a power source that supplies power to the real-time clock and the volatile memory; a printer; a printer board for the printer, connected to the management board, the method comprising: when the management board and the printer board are connected to each other, forming the power supply path to the real-time clock and the volatile memory to supply the power; and when the management board and the printer board are disconnected from each other, shutting off the power supply path to at least one of the real-time clock and the volatile memory to shut off the power.

With this configuration, when the management board and the printer board are disconnected from each other, the power supply to the real-time clock is shut off and the current date and time measured by the real-time clock is erased, or the power supply to the volatile memory is shut off and data stored in the volatile memory is erased.

It is assumed that the power supply to the real-time clock is shut off and thus the current date and time measured by the real-time clock is erased. In this case, after the management board and the printer board are disconnected from each other, even when the management board and the printer board are again connected to each other and power is supplied to the real-time clock, the real-tune clock is reset and starts to operate from an initial value. For this reason, data representing the date and time divorced from the actual current date and time is output from the real-time clock to the control section. Thus, taking advantage of the date and time represented by data input from the real-time clock being divorced from the actual date and time, the control section can detect falsification which is done after the management board and the printer board are disconnected from each other, and can perform effective processing against falsification, such as stopping the actuation of the electronic apparatus or giving a notification indicating that falsification is likely to have been done. The trace of falsification is retained, making it possible to rapidly and reliably recognize that falsification has been done.

It is assumed that the power supply to the volatile memory is shut off and thus data stored in the volatile memory is erased. In this case, after the management board and the printer board are disconnected from each other, even when the management board and the printer board are again connected to each other and power is supplied to the volatile memory, normal access to the memory cannot be performed by the control section using data stored in the volatile memory, and on the basis of this situation, the control section can detect falsification which is done after the cover is placed in the open state, and can perform effective processing against falsification, such as stopping the actuation of the electronic apparatus or giving a notification indicating that falsification is likely to have been done. The trace of falsification is retained, making it possible to rapidly and reliably recognize that falsification has been done.

According to a fourteenth aspect of the embodiments of the present invention, there is provided a method of controlling an electronic apparatus, comprising: storing fiscal data including data indicating current date and time measured by a real-time clock and fiscal information, in a memory; and when an open state of a cover of a housing box which houses a management board with the memory mounted thereon is detected, erasing the current date and time of the real-time clock or erasing data for access to the memory, which is stored in a volatile memory.

With this configuration, when the cover of the housing box is placed in the open state, the current date and time measured by the real-time clock is erased, or data for access to the memory which is stored in the volatile memory is erased. Erasure of the current date and time may be performed through rewriting or resetting of data held by the real-time clock.

When the current date and time measured by the real-time clock, data representing the date and time divorced from the actual current date and time is output from the real-time clock to the control section. Thus, even when the cover of the housing box is again placed in the closed state, the date and time represented by data input from the real-time clock is divorced from the actual date and time. Thus, taking advantage of this situation, the control section can detect falsification which is done after the cover is placed in the open state, and can perform effective processing against falsification, such as stopping the actuation of the electronic apparatus or giving a notification indicating that falsification is likely to have been done. The trace of falsification is retained, making it possible to rapidly and reliably recognize that falsification has been done.

When data for access to the memory which is stored in the volatile memory is erased, after the cover of the housing box is placed in the open state, normal access to the memory cannot be performed by the control section using data stored in the volatile memory, and on the basis of this situation, the control section can detect falsification which is done after the cover is placed in the open state, and can perform effective processing against falsification, such as stopping the actuation of the electronic apparatus or giving a notification indicating that falsification is likely to have been done. The trace of falsification is retained, making it possible to rapidly and reliably recognize that falsification has been done.

According to a fifteenth aspect of the embodiments of the present invention, there is provided a method of controlling an electronic apparatus, comprising: storing fiscal data including data indicating current date and time measured by a real-time clock and fiscal information, in a memory; and when it is detected that a management hoard with the memory mounted thereon is disconnected from a printer hoard for a printer, erasing the current date and time of the real-time clock or erasing data for access to the memory, which is stored in a volatile memory:

With this configuration, when the management board and the printer board are disconnected from each other, the current date and time measured by the real-time clock is erased or reset, or data stored in the volatile memory is erased. Erasure of the current date and time may be performed through rewriting or resetting of data held by the real-time clock.

When the current date and time measured by the real-time clock is erased or reset, after the management board and the printer board are disconnected from each other, data representing the date and time divorced from the actual current date and time is output from the real-time clock to the control section. Thus, even when the management board and the printer board are again connected to each other, the date and time represented by data input from the real-time clock is divorced from the actual date and time. Thus, taking advantage of this situation, the control section can detect falsification which is done after the management board and the printer board are disconnected from each other, and can perform effective processing against falsification, such as stopping the actuation of the electronic apparatus or giving a notification indicating that falsification is likely to have been done. The trace of falsification is retained, making it possible to rapidly and reliably recognize that falsification has been done.

When data stored in the volatile memory is erased, after the management board and the printer board are disconnected from each other, normal access to the memory cannot be performed by the control section using data stored in the volatile memory, and on the basis of this situation, the control section can detect falsification which is done after the management board and the printer board are disconnected from each other, and can perform effective processing against falsification, such as stopping the actuation of the electronic apparatus or giving a notification indicating that falsification is likely to have been done. The trace of falsification is retained, making it possible to rapidly and reliably recognize that falsification has been done.

According to the aspects of the invention, it is possible to provide an electronic apparatus which is capable of performing effective processing against falsification of fiscal information stored in the memory, and a method of controlling an electronic apparatus.

DETAILED DESCRIPTION OF THE EMBODIMENTS

Hereinafter, embodiments of the invention will be described with reference to the drawings.

First Embodiment

Figure 1:
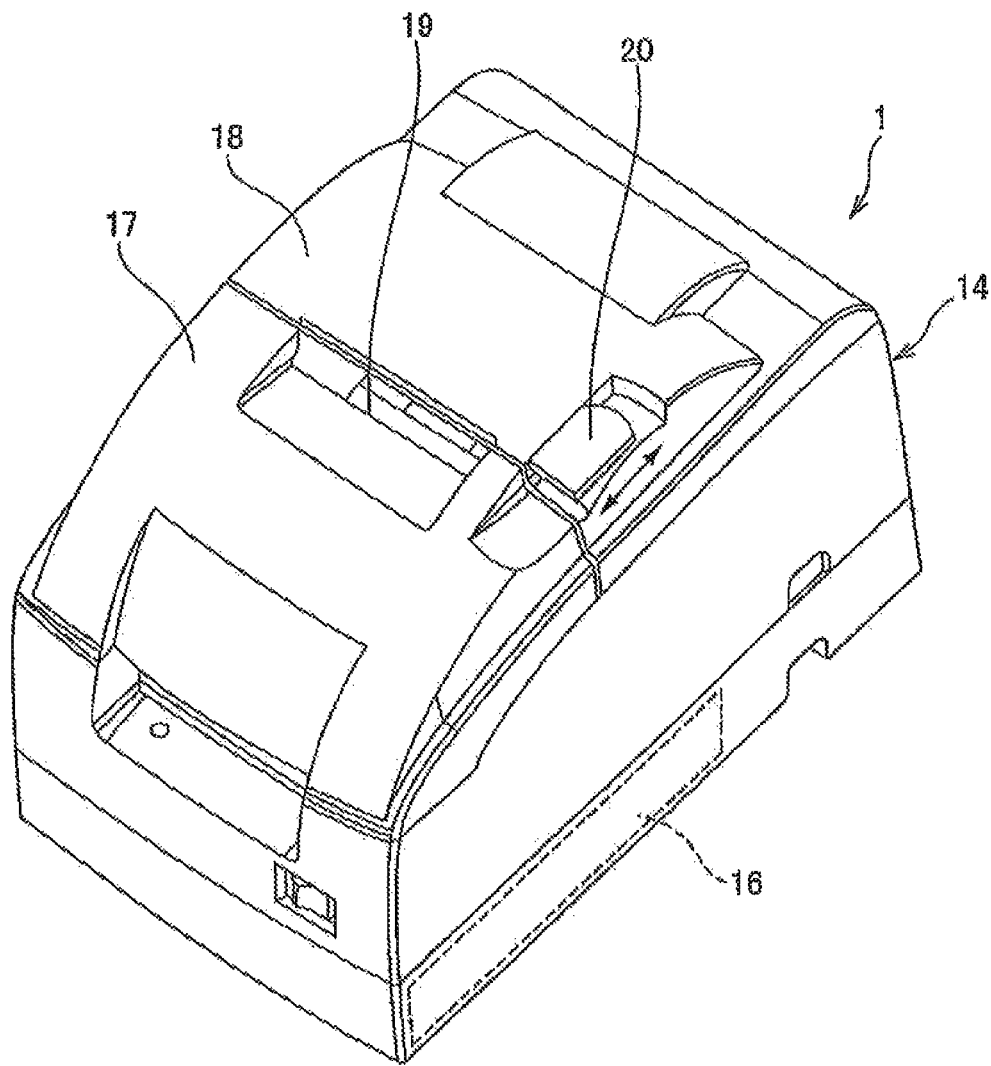
FIG. 1 is an exterior perspective view of a fiscal printer according to a first embodiment when viewed from above.
Figure 2:
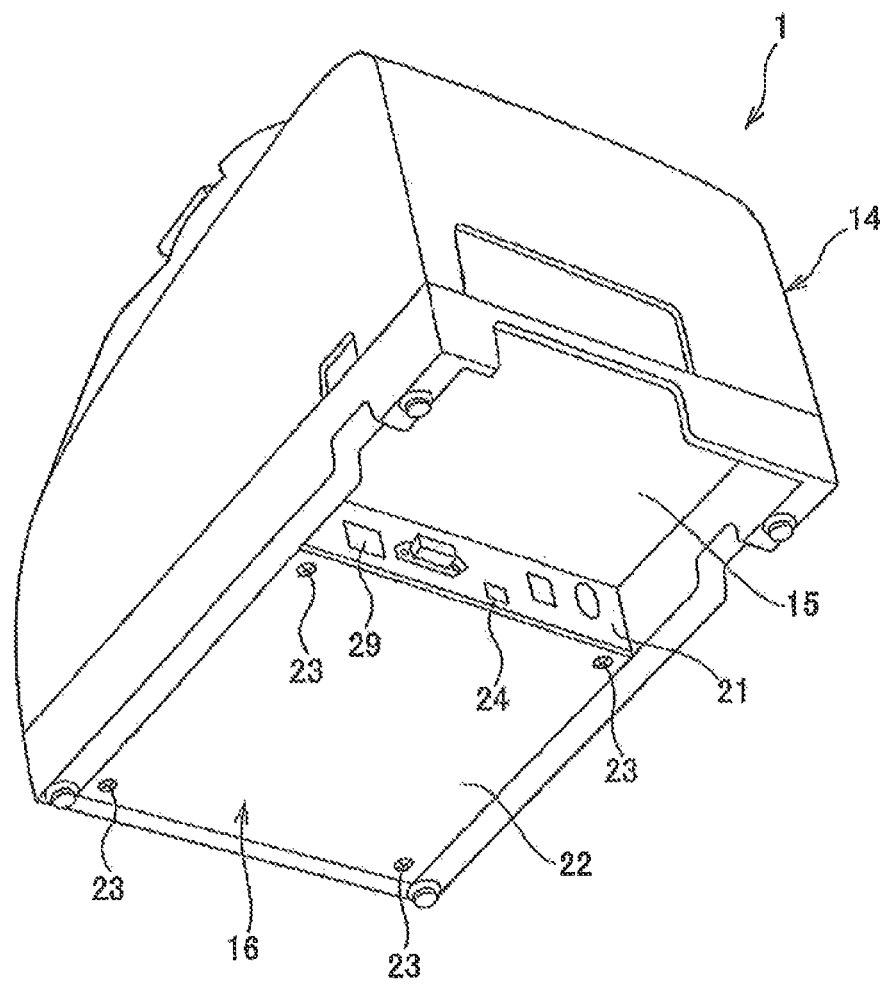
FIG. 2 is an exterior perspective view of a fiscal printer when viewed from below.

FIG. 1 is an exterior perspective view of a fiscal printer 1 (electronic apparatus) according to this embodiment when viewed from above. FIG. 2 is an exterior perspective view of the fiscal printer 1 when viewed from below.

The fiscal printer 1 of this embodiment is connected to a host computer 10 (FIG. 4), such as a POS terminal, and issues a receipt and stores data including fiscal information input from the host computer 10 under the control of the host computer 10. It is assumed that the fiscal information references information regarding sales transactions of articles or the like (information regarding sales or information regarding the tax amount or the like), and information which is predefined as information to be stored. The fiscal information is used as information which is referenced, for example, when a state institution, such as the government, ascertains the actual status of transactions so as to collect tax from a shop. In this embodiment, as data including fiscal information, there are two types of write receipt data 11 and daily sales data 12 described below.

As shown in FIGS. 1 and 2, the fiscal printer 1 includes a printer main body 14, and a housing box 16 which is fastened to a bottom portion 15 of the printer main body 14.

Inside the printer main body 14 are housed a transport mechanism for transporting a roll sheet, a mechanism or device for issuing a receipt, such as a recording mechanism for recording an image on a roll sheet, a roll sheet accommodating section for accommodating a roll sheet, and the like.

As shown in FIG. 1, the printer main body 14 includes a front opening/closing cover 17 which covers the front portion of the top surface of the printer main body 14, and a rear opening/closing cover 18 which covers the rear portion of the top surface of the printer main body 14. A recording sheet discharge port 19 is formed between the front opening/closing cover 17 and the rear opening/closing cover 18 so as to extend in the width direction. If a slide button 20 is manipulated which is arranged lateral to the recording sheet discharge port 19, a lock mechanism (not shown) is disengaged, such that the rear opening/closing cover 18 can be opened. If the rear opening/closing cover 18 is opened, the roll sheet accommodating section is exposed, such that the roll sheet can be replaced. If the front opening/closing cover 17 is opened, replacement of an ink ribbon or the like can be performed.

As shown in FIG. 2, the housing box 16 includes a boxlike box main body 21 which has an opening at the bottom, and a cover 22 which covers the opening of the box main body 21. The cover 22 is fixed to the box main body 21 by screws 23.

At the rearward lateral surface of the box main body 21 are provided a PC connector 24 to which the host computer 10 is connected, and a fiscal connector 29 to which a fiscal data reading device 25 (described below) (external device) is connected, in addition to a power supply adaptor, a network cable, a connector to which a cable connected to a board inside the printer main body 14 is connected.

Figure 3:
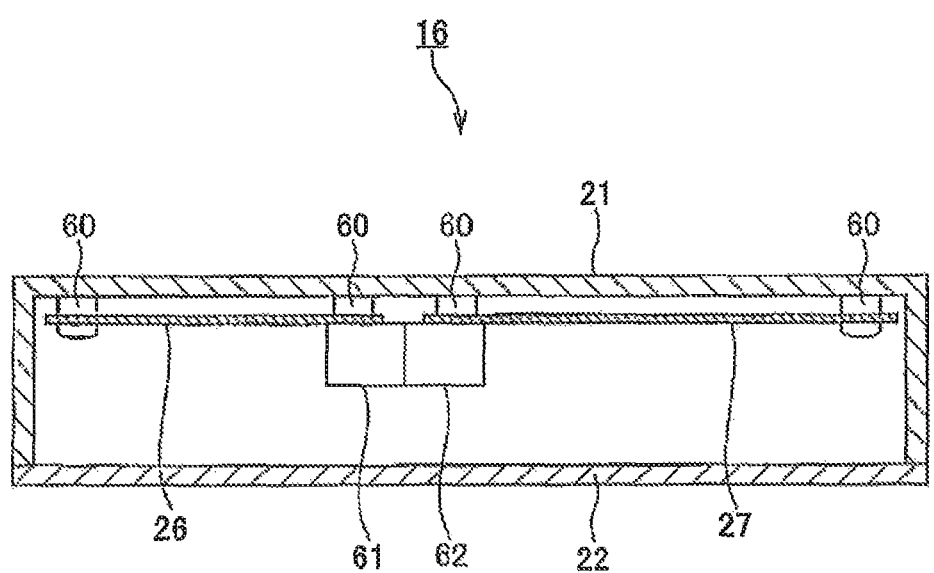
FIG. 3 is a sectional view of a housing box.
Figure 4:
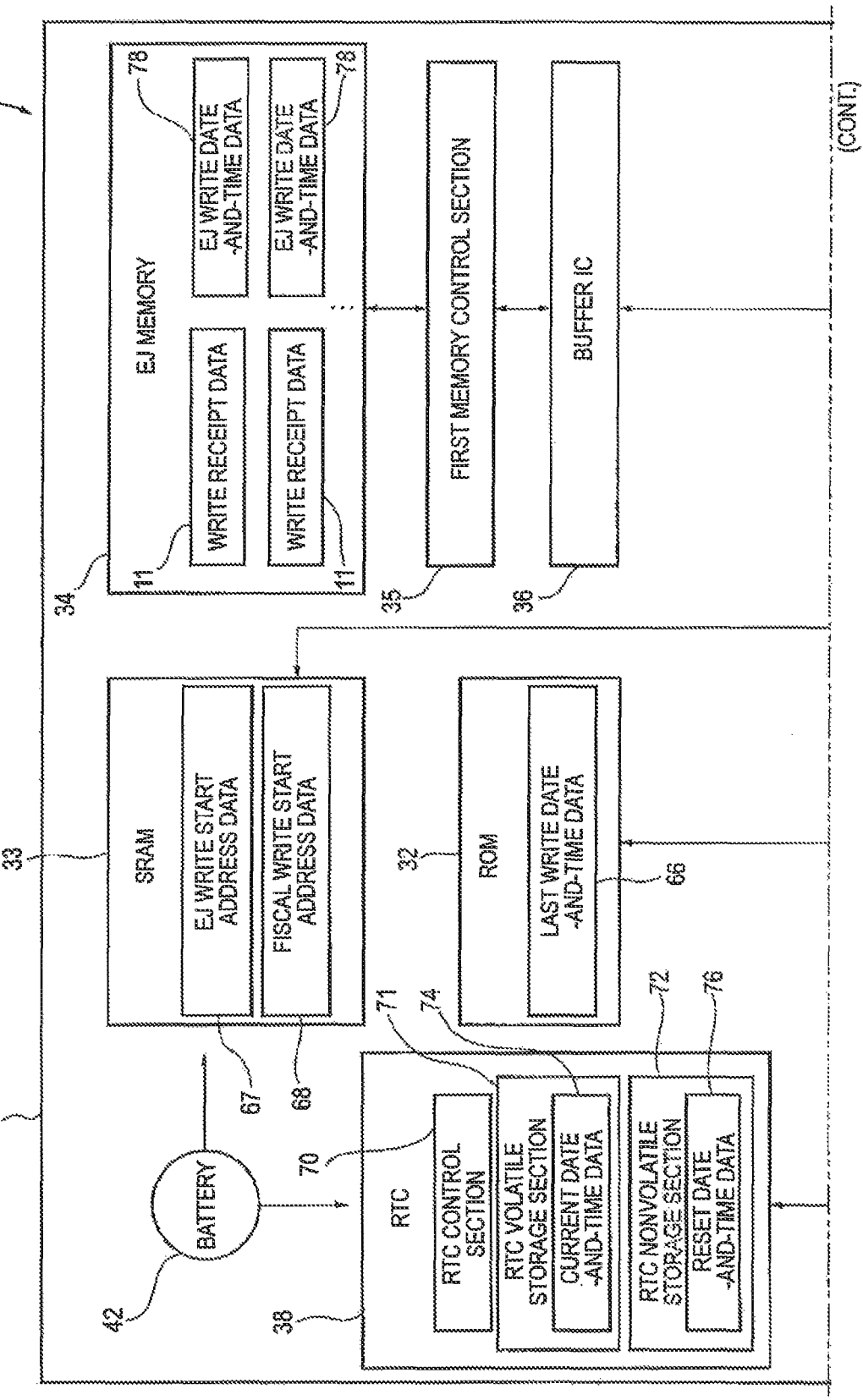
FIG. 4 is a circuit configuration diagram of a fiscal printer.
Figure 4:
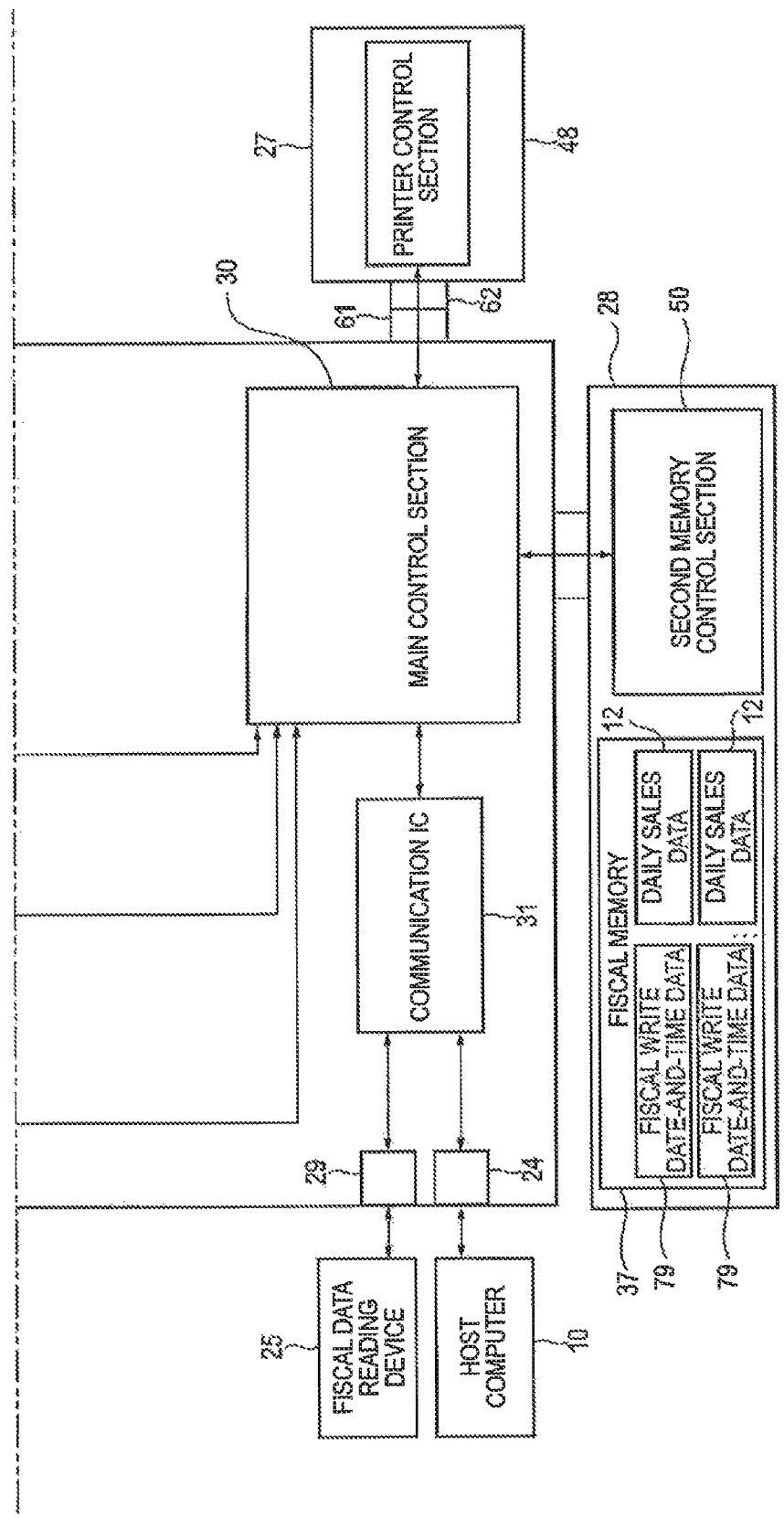

Inside the housing box 16 are housed a management board 26, a printer board 27 (see FIGS. 3 and 4), and a sub board 28 (see FIG. 4).

FIG. 3 is a sectional view of the housing box 16.

As shown in FIG. 3, inside the housing box 16, the management board 26 and the printer board 27 are fastened to the housing box 16 by fastening members 60. The management board 26 is provided with a management-side connector 61, and the printer board 27 is provided with a printer-side connector 62. The management board 26 and the printer board 27 are connected to each other through these connectors, in this way, the management board 26 and the printer board 27 are housed in the housing box 16. In performing physical access to these boards, it is necessary that the cover 22 of the housing box 16 is placed in the open state.

The open state of the cover 22 references the state where the cover 22 is detached from the box main body 21, and the inside of the housing box 16 is exposed. The closed state of the cover 22 references the state where the cover 22 of the box main body 21 is attached, and the opening of the box main body 21 is blocked by the cover 22.

Though not shown, the sub board 28 (FIG. 4) is also housed in the housing box 16.

FIG. 4 is a circuit configuration diagram of the fiscal printer 1. In particular. FIG. 4 schematically shows the circuit configuration of the management board 26, the printer board 27, and the sub board 28 provided in the housing box 16.

As shown in FIG. 4, on the management board 26 are mounted a main control section 30 (control section), the PC connector 24, the fiscal connector 29, a communication IC 31, a ROM 32, an SRAM 33 (volatile memory), an RTC 38, an EJ memory 34 (memory), a first memory control section 35, and a buffer IC 36.

The main control section 30 centrally controls the respective sections of the fiscal printer 1, and includes a CPU and other peripheral circuits.

The PC connector 24 is a connector to which the host computer 10 is connected at the time of normal use of the fiscal printer 1. The host computer 10 outputs a printing command related to issuance of a receipt to the fiscal printer 1 through the PC connector 24, and outputs daily sales data 12 which is data including fiscal information.

The fiscal connector 29 is a connector to which the fiscal data reading device 25 is connected. The fiscal data reading device 25 is a device for reading data stored in the EJ memory 34 or the fiscal memory 37 (memory) described below, and only an authorized person, such as a person who belongs to a state institution (the government or the like), can possess the fiscal data reading device 25. Although the above-described host computer 10 is maintained in a state of being connected to the PC connector 24, unlike the host computer 10, the fiscal data reading device 25 is appropriately connected to the fiscal connector 29 in reading data.

The communication IC 31 is connected to the PC connector 24 and the fiscal connector 29, and performs transmission/reception of data between the host computer 10 and the fiscal data reading device 25 under the control of the main control section 30.

The ROM 32 stores a control program (firmware) or control data which is used when the main control section 30 performs various types of control. In this embodiment, as the ROM 32, a memory, such as an EEPROM, is used in which data is rewritable. Although the last write date-and-time data 66 is stored in the ROM 32, this will be described below.

The SRAM 33 is a volatile memory which functions as the work area of the CPU of the main control section 30, and temporarily stores various kinds of data. Although the SRAM 33 stores EJ write start address data 67 and fiscal write start address data 68, these will be described below.

While the fiscal printer 1 is powered on and power is supplied from the commercial power source to the fiscal printer 1, power is also supplied from the commercial power source to the SRAM 33. Meanwhile, while the fiscal printer 1 is powered off and power from the commercial power source to the fiscal printer 1 is shut off, power for backup is supplied from a battery 42 (power source) to the SRAM 33.

The RTC 38 (Real-time clock) outputs data representing current date and time (date and time) to the main control section 30, and includes an RTC control section 70, an RTC volatile storage section 71, and an RTC nonvolatile storage section 72.

The RTC control section 70 performs a time measurement operation on the basis of a reference clock generated by an oscillator (not shown), and updates current date-and-time data 74 stored in the RTC volatile storage section 71. The RTC control section 70 adds the measured time to a predetermined default value to calculate the current date and time, and updates current date-and-time data 74 stored in the RTC volatile storage section 71 by data representing the calculated current date and time. The RTC control section 70 appropriately outputs data representing the current date and time to the main control section 30 on the basis of current date-and-time data 74 stored in the RTC volatile storage section 71.

The RTC volatile storage section 71 is a volatile memory which holds stored data only when power is supplied to the RTC 38, and when the power supply to the RTC 38 is shut off, erases stored data. After the power supply to the RTC 38 is shut off and thus current date-and-time data 74 stored in the RTC volatile storage section 71 is erased, when power is again supplied to the RTC 38, the RTC 38 is reset to an initial value and starts to operate. For this reason, the current date and time represented by current date-and-time data 74 stored in the RTC volatile storage section 71 becomes the date and time which is divorced from the actual current date and time.

The RTC nonvolatile storage section 72 is a nonvolatile memory which holds stored data, regardless of the presence/absence of a power supply to the RTC 38. The RTC nonvolatile storage section 72 is provided so as to store reset date-and-time data 76 (described below) even when the power supply to the RTC 38 is shut off.

Similarly to the SRAM 33, while power is supplied from the commercial power source to the fiscal printer 1 after the fiscal printer 1 is powered on, power is supplied from the commercial power source to the RTC 38. Meanwhile, while the fiscal printer 1 is powered off and power from the commercial power source to the fiscal printer 1 is shut off, power for backup is supplied from the battery 42.

The EJ memory 34 is a NAND-type flash memory which can store a large quantity of data. The EJ memory 34 functions as a memory in which data can be written into one address once only under the control of the first memory control section 35. Therefore, data written into the EJ memory 34 is prevented from being edited later, and data stored in the EJ memory 34 is prevented from being falsified.

The first memory control section 35 includes a CPU, and reads/writes data with respect to the EJ memory 34 under the control of the main control section 30. When data, specifically, write receipt data 11 (described below) which is data including fiscal information is written into the EJ memory 34, the first memory control section 35 writes data after having encrypted data. A function of decoding encrypted data is provided only in a device, such as the above-described fiscal data reading device 25, in which data including fiscal information is allowed to be regularly read. Therefore, it is possible to prevent the contents of write receipt data 11 from leaking.

The buffer IC 36 controls a buffer which is provided to improve efficiency of reading and writing of data with respect to the EJ memory 34.

The EJ memory 34, the first memory control section 35, and the buffer IC 36 are sealed to the management board 26 with epoxy resin and, for example, after the EJ memory 34 is physically detached from the management board 26, data stored in the EJ memory 34 is prevented from being falsified.

On the printer board 27 is mounted a printer control section 48. The printer control section 48 includes a CPU and various peripheral circuits, and controls the above-described transport mechanism for transporting the roll sheet and the mechanism or the device (recording section) for issuing a receipt, such as the image recording mechanism for recording an image on the roll sheet, to issue a receipt on the basis of the printing command. The printer board 27 is provided with the printer-side connector 62, and the management board 26 is provided with the management-side connector 61. The printer-side connector 62 and the management-side connector 61 are connected to each other, such that the management board 26 and the printer board 27 are connected to each other.

In this embodiment, in issuing a receipt, first, the host computer 10 connected to the fiscal printer 1 generates a printing command and outputs the generated printing command to the main control section 30 through the PC connector 24. The main control section 30 to which the printing command is input outputs the input printing command to the printer control section 48.

On the sub board 28 are mounted the fiscal memory 37 and a second memory control section 50.

The fiscal memory 37 is a memory which includes an EPROM. Daily sales data 12 which will be described below is stored in the fiscal memory 37. The fiscal memory 37 functions as a memory in which data can be written into one address only once under the control of the second memory control section 50. Therefore, data written into the fiscal memory 37 is prevented from being edited later, and data stored in the fiscal memory 37 is prevented from being falsified.

The second memory control section 50 includes a CPLD (Complex Programmable Logic Device) serving as a device in which a programmable logic circuit is written, and reads/writes data with respect to the fiscal memory 37 under the control of the main control section 30. When data, specifically, daily sales data 12 (described below) which is data including fiscal information is written into the fiscal memory 37, the second memory control section 50 writes data after having encrypted data. A function of decoding encrypted data is provided only in a device, such as the above-described fiscal data reading device 25, in which data including fiscal information is allowed to be regularly read. Therefore, the contents of daily sales data 12 is prevented from leaking.

The fiscal memory 37 and the second memory control section 50 are sealed to the sub board 28 with epoxy resin and, for example, when the fiscal memory 37 is physically detached from the sub board 28, data stored in the fiscal memory 37 is prevented from being falsified.

Next, write receipt data 11 stored in the EJ memory 34 and daily sales data 12 stored in the fiscal memory 37 will be described. As described above, these kinds of data correspond to data including fiscal information.

Write receipt data 11 references data which represents information recorded on a receipt issued by the fiscal printer 1, and data which is predefined as data to be stored. For example, when information representing each purchased article of the customer, information representing the unit price of each purchased article, information representing the number of purchased articles, information representing the purchase price of each purchased article, information representing the total purchase price of all articles, and the like are recorded on a receipt, if data representing these kinds of information is predefined as data to be stored, data representing these kinds of information corresponds to write receipt data 11. As described above, in this embodiment, when a receipt is issued by the fiscal printer 1, a printing command is generated by the host computer 10, the printing command is output to the main control section 30, and the printing command is output from the main control section 30 to the printer control section 48. At this time, the main control section 30 extracts information to be stored as write receipt data 11 from the printing command, and controls the first memory control section 35 to store the extracted information in the EJ memory 34 as write receipt data 11.

In writing write receipt data 11 into the EJ memory 34, the main control section 30 acquires data representing the current date and time from the RTC 38, acquires the date and time, at which writing is performed, on the basis of acquired data, and writes write receipt data 11 in a state where data (EJ write date-and-time data 78) representing the acquired date and time and write receipt data 11 are associated with each other. That is, write receipt data 11 is stored in the EJ memory 34 in association with EJ write date-and-time data 78 which is data representing the date and time at which writing is performed with respect to the EJ memory 34.

In this way, although in this embodiment, EJ write date-and-time data 78 and write receipt data 11 are stored in association with each other, this is because, in some countries, the law or regulations require this association. Therefore, the fiscal printer 1 has the RTC 38, which measures the current date and time, as an essential member.

Daily sales data 12 references data which represents the total sales of the shop every day. After the shop is closed, the host computer 10 calculates the total sales on that day, generates daily sales data 12 on the basis of the calculated total sales, and outputs generated daily sales data 12 to the main control section 30. If daily sales data 12 is input, the main control section 30 controls the second memory control section 50 and writes daily sales data 12 into the fiscal memory 37.

In writing daily sales data 12 into the fiscal memory 37, the main control section 30 causes the RTC 38 to output data representing the current date and time, acquires the date and time, at which writing is performed, on the basis of data, and writes daily sales data 12 into the fiscal memory 37 in a state where data (fiscal write date-and-time data 79) representing the acquired date and time is associated with daily sales data 12. That is, daily sales data 12 is stored in the fiscal memory 37 in association with fiscal write date-and-time data 79 which is data representing the date and time at which writing is performed with respect to the fiscal memory 37.

In this way, although in this embodiment, fiscal write date-and-time data 79 is stored in association with daily sales data 12, this is because, in some countries, the law or regulations require this association. Therefore, the fiscal printer 1 has the RTC 38, which measures the current date and time, as an essential member.

Next, the last write date-and-time data 66 will be described. Last write date-and-time data 66 references data which represents the last date and time at which the main control section 30 controls the first memory control section 35 or the second memory control section 50 to write data into the EJ memory 34 or the fiscal memory 37. Each time data is written into these memories, the main control section 30 updates the last write date-and-time data 66 on the basis of data representing the current date and time input from the RTC 38.

In this embodiment, the main control section 30 performs the following operation in writing data into the EJ memory 34 or the fiscal memory 37.

That is, the main control section 30 acquires the last write date-and-time data 66 stored in the ROM 32 before writing data and compares the date and time represented by the acquired last write date-and-time data 66 with the date and time represented by data input from the RTC 38. When data input from the RTC 38 is normal, the date and time represented by the last write date-and-time data 66 should be temporally earlier than the date and time represented by data input from the RTC 38.

When the date and time represented by the last write date-and-time data 66 is temporally earlier than the date and time represented by data input from the RTC 38, the main control section 30 continuously performs data writing processing.

Meanwhile, when the date and time represented by the last write date-and-time data 66 is temporally later than the date and time represented by data input from the RTC 38, the main control section 30 determines that an RTC error occurs and then stops the actuation of the fiscal printer 1.

When the date and time represented by the last write date-and-time data 66 is temporally later than the date and time represented by data input from the RTC 38, this means that any abnormality occurs in the RTC 38, or as described below, means that the cover 22 is placed in the open state and current date-and-time data 74 stored in the RTC volatile storage section 71 of the RTC 38 is reset.

Next, EJ write start address data 67 and fiscal write start address data 68 stored in the SRAM 33 will be described.

EJ write start address data 67 references data which represents an EJ write start address. The EJ write start address references the address where writing starts in the memory area of the EJ memory 34 in writing data into the EJ memory 34. In this embodiment, each time data is written into the EJ memory 34, the first memory control section 35 acquires the EJ write start address in writing data into the EJ memory 34 next time, and outputs data representing the acquired write start address to the main control section 30. The main control section 30 stores data representing the EJ write start address in the SRAM 33, when write receipt data 11 is written into the EJ memory 34 next time, acquires EJ write start address data 67 from the SRAM 33, and outputs a write request command indicating that data is written into the address represented by acquired EJ write start address data 67.

As described above, EJ write start address data 67 is data which is necessary for outputting a write request command, and when EJ write start address data 67 stored in the SRAM 33 is erased, the main control section 30 cannot generate a normal write request command. For this reason, in this embodiment, the main control section 30 references the SRAM 33 when the fiscal printer 1 is powered on, and when EJ write start address data 67 stored in the SRAM 33 is erased, determines that there is an SRAM error and stops the subsequent actuation of the fiscal printer 1.

Fiscal write start address data 68 references data which represents the fiscal write start address. The fiscal write start address references the address where writing starts in the memory area of the fiscal memory 37 in writing data in the fiscal memory 37. The use mode of the fiscal write start address is the same as the use mode of the EJ write start address, thus description thereof will be omitted.

On the other hand, the management board 26 or the sub board 28 is housed in the housing box 16. On the management board 26 is mounted the EJ memory 34 which stores write receipt data 11 which is data including fiscal information. Similarly, on the sub board 28 is mounted the fiscal memory 37 which stores daily sales data 12 which is data including fiscal information.

Therefore, when a person with an illegal purpose tries to falsify write receipt data 11 stored in the EJ memory 34 or daily sales data 12 stored in the fiscal memory 37, it is thought that, if the fiscal printer 1 is powered off, the housing box 16 is detached from the printer main body 14, the cover 22 of the housing box 16 is placed in the open state to expose each board housed in the housing box 16, and processing related to falsification is performed in the memories.

As a result, when the cover 22 of the housing box 16 is placed in the open state, then, if the fiscal printer 1 is configured to be normally operated, it is possible to reliably detect that falsification is likely to have been done, restraining falsification.

Figure 5:
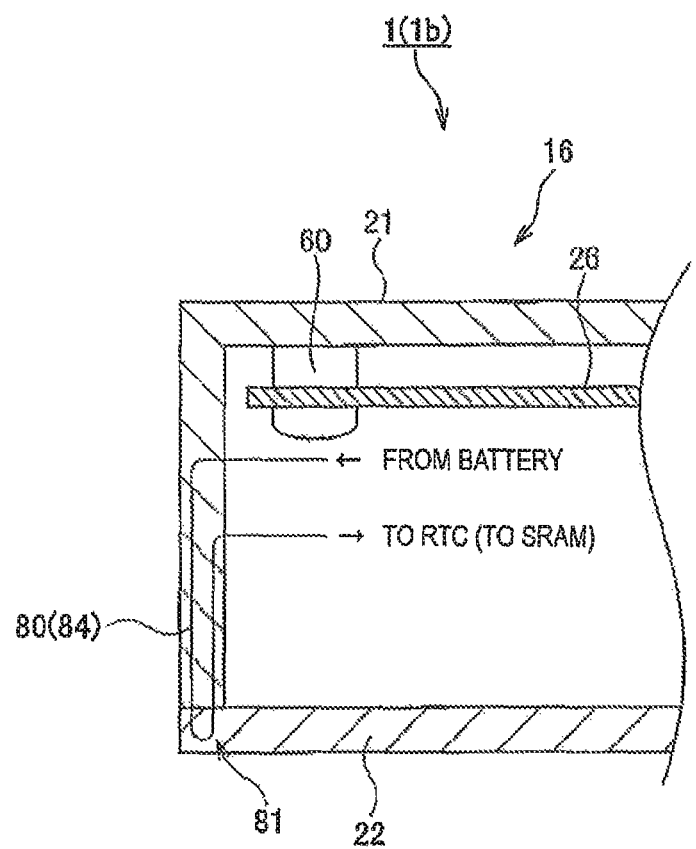
FIG. 5 is a sectional view of a main part of a fiscal printer according to the first embodiment and a second embodiment.

FIG. 5 is a sectional view of the housing box 16 and is a diagram schematically showing a power supply line 80 (power supply path) which is provided between the battery 42 and the RTC 38 to supply power from the battery 42 to the RTC 38.

As shown in FIG. 5, the power supply line 80 extends along the lateral surface of the box main body 21, and has a protruding portion 81 which partially protrudes inward of the cover 22. When the protruding portion 81 is rigidly fastened to the cover 22, and the cover 22 is placed in the open state, the protruding portion 81 is physically separated from the power supply line 80 with the cover 22 being separated from the box main body 21, such that the power supply line 80 is disconnected.

With such a form, when the cover 22 is in the closed state, the battery 42 and the RTC 38 are connected to each other through the power supply line 80, such that the power supply is normally performed from the battery 42 to the RTC 38.

Meanwhile, the cover 22 is placed in the open state, and the power supply line 80 is mechanically shut off at the protruding portion 81, such that the power supply from the battery 42 to the RTC 38 is shut off. When the fiscal printer 1 is powered off or when the housing box 16 is detached from the printer main body, power is supplied from the battery 42 to the RTC 38, such that the cover 22 is placed in the open state. For this reason, the power supply from the battery 42 to the RTC 38 is shut off, and the whole power supply to the RTC 38 is shut off. Thus, current date-and-time data 74 stored in the RTC volatile storage section 71 is erased, and the subsequent actuation of the RTC 38 is stopped.

In this way, in this embodiment, when the cover 22 is placed in the open state, the power supply line 80 is shut off, the power supply to the RTC 38 is shut off, and current date-and-time data 74 stored in the RTC volatile storage section 71 is erased.

After current date-and-time data 74 is erased, the cover 22 is again placed in the closed state and the housing box 16 is normally attached to the printer main body 14. Simultaneously, electrical connection is normally provided between each board housed in the housing box 16 and the mechanism or the device for issuing a receipt, and the fiscal printer 1 is powered on. During this procedure, the operation of the fiscal printer 1 will be described. In this case, power is supplied from the commercial power source to the RTC 38. The RTC 38 is reset and starts to operate from an initial value.

As described above, in this embodiment, when data is written into the EJ memory 34 or the fiscal memory 37, the main control section 30 compares the date and time represented by the last write date-and-time data 66 stored in the ROM 32 with the date and time represented by data input from the RTC 38. When the date and time represented by the last write date-and-time data 66 stored in the RUM 32 is temporally later than the date and time represented by data input from the RTC 38, the main control section 30 determines that an RTC error occurs and then stops the actuation of the fiscal printer 1.

As a result, the power supply to the RTC 38 is temporarily shut off due to the cover 22 being placed in the open state, such that current date-and-time data 74 stored in the RTC volatile storage section 71 is erased. In this case, in comparison of the date and time at the time of writing of data by the main control section 30, it is determined that the date and time represented by the last write date-and-time data 66 stored in the ROM 32 is temporally later than the date and time represented by data input from the RTC 38, then, the main control section 30 stops the actuation of the fiscal printer 1.

In this way, in this embodiment, after the housing box 16 is detached from the printer main body 14, when the cover 22 is placed in the open state, in other words, when access is possible to data stored in the EJ memory 34 or the fiscal memory 37 for the purpose of falsification, the operation of the fiscal printer 1 is stopped. In this case, it becomes impossible to print a receipt or the like.

Thus, it is possible to prevent the cover 22 from being placed in the open state for the purpose of falsification and, when the cover 22 is placed in the open state, it is possible to reliably detect the open state of the cover 22. That is, the fiscal printer 1 performs effective processing against falsification.

As described above, in the fiscal printer 1 of this embodiment, if the cover 22 is placed in the open state, the power supply line 80 is mechanically shut off and the power supply to the RTC 38 is shut off.

Accordingly, when the cover 22 is placed in the open state, the power supply to the RTC 38 is shut off, and the current date and time measured by the RTC 38 is erased. For this reason, after the cover 22 is placed in the open state, data representing the date and time divorced from the actual current date and time is output from the RTC 38 to the main control section 30. Thus, taking advantage of the date and time represented by data input from the RTC 38 being divorced from the actual date and time, the main control section 30 can perform effective processing against falsification which is done after the cover 22 is placed in the open state, such as stopping the actuation of the fiscal printer 1 after the cover 22 is placed in the open state.

Second Embodiment

Next, a fiscal printer 1b according to a second embodiment will be described with reference to FIG. 5.

In FIG. 5, a power supply line 84 (power supply path) for supplying power from the battery 42 to the SRAM 33 corresponds to the power supply line 80 for supplying power from the battery 42 to the RTC 38 which has been described in the first embodiment.

In the above-described first embodiment, when the cover 22 is placed in the open state, the power supply line 80 for supplying power from the battery 42 to the RTC 38 is mechanically shut off. Meanwhile, in this embodiment, when the cover 22 is placed in the open state, the power supply line 84 for supplying power from the battery 42 to the SHAM 33 is mechanically shut off, such that the power supply from the battery 42 to the SRAM 33 is shut off That is, when the cover 22 is in the closed state, the battery 42 and the SRAM 33 are electrically connected to each other through the power supply line 84, such that the power supply from the battery 42 to the SRAM 33 is normally performed. Meanwhile, when the cover 22 is placed in the open state, a protruding portion 81 of the power supply line 84 is mechanically shut off, then, the power supply from the battery 42 to the SRAM 33 is shut off When the fiscal printer 1 is powered off or when the housing box 16 is detached from the printer main body 14, if power is supplied from the battery 42 to the SRAM 33, the cover 22 is placed in the open state, such that the power supply from the battery 42 to the SRAM 33 is shut off. In this case, the whole power supply to the SRAM 33 is shut off, such that data stored in the SRAM 33 serving as a volatile memory is erased. Erased data includes EJ write start address data 67 and fiscal write start address data 68.

In this way, in this embodiment, when the cover 22 is placed in the open state, EJ write start address data 67 or fiscal write start address data 68 stored in the SRAM 33 is erased. Meanwhile, as described above, when these kinds of data are erased, if the fiscal printer 1b is powered on, it is determined that there is an SRAM error, and the subsequent actuation of the fiscal printer 1b is stopped. Therefore, it is possible to obtain the same effects as those in the first embodiment.

As described above, in the fiscal printer 1b of this embodiment, if the cover 22 is placed in the open state, the power supply line 84 for supplying power from the battery 42 to the SRAM 33 is mechanically shut off, such that the power supply to the SRAM 33 serving as a volatile memory is shut off.

With this configuration, when the cover 22 of the housing box 16 is placed in the open state, the power supply to the SRAM 33 is shut off, and data, such as EJ write start address data 67 or fiscal write start address data 68 stored in the SRAM 33, is erased. For this reason, after the cover 22 of the housing box 16 is placed in the open state, normal access to the EJ memory 34 or the fiscal memory 37 cannot be performed by the main control section 30 using data stored in the SRAM 33, and on the basis of this situation, the main control section 30 can perform effective processing against falsification after the cover 22 is placed in the open state, such as stopping the actuation of the fiscal printer 1b after the cover 22 is placed in the open state.

Third Embodiment

Next, a fiscal printer 1c of a third embodiment will be described,

In the following description, the same parts as those in the first embodiment are represented by the same reference numerals, and description thereof will be omitted.

In the above-described first embodiment, when the cover 22 is placed in the open state, the power supply line 80 which connects the battery 42 and the RTC 38 is mechanically shut off such that the power supply to the RTC 38 is shut off, and on the basis of this situation, the actuation of the fiscal printer 1 is stopped after the cover 22 is placed in the open state. Meanwhile, in this embodiment, when the management board 26 is detached from the housing box 16, a power supply line which connects the battery 42 and the RTC 38 and a power supply line which connects the battery 42 and the SRAM 33 are mechanically shut off such that the power supply to the RTC 38 and the power supply to the SRAM 33 are shut off, and on the basis of this situation, the actuation of the fiscal printer 1c is stopped after the management board 26 is detached from the housing box 16.

At the time of normal use, the management board 26 is not detached from the housing box 16. When the management hoard 26 is detached from the housing box 16, it is thought that a person with an illegal purpose who tries to falsify write receipt data 11 or the like stored in the EJ memory 34 has detached the management board 26 from the housing box 16 for the sake of improving ease of working. Therefore, if the actuation of the fiscal printer 1c is stopped when the management board 26 is detached from the housing box 16, it is possible to restrain the above-described falsification. When the management board 26 is detached from the housing box 16, it is possible to reliably detect the detachment. That is, the fiscal printer is can perform effective processing against falsification.

Figure 6A:
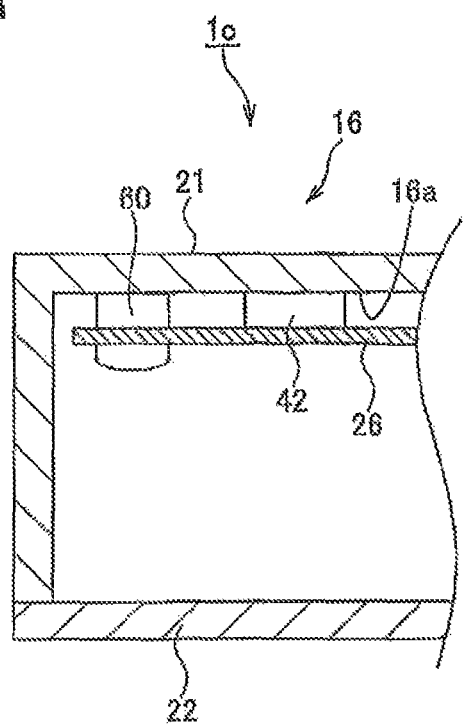
FIG. 6A is a sectional view of a main part of a fiscal printer according to a third embodiment in a state where a management board is attached to a housing box.
Figure 6B:
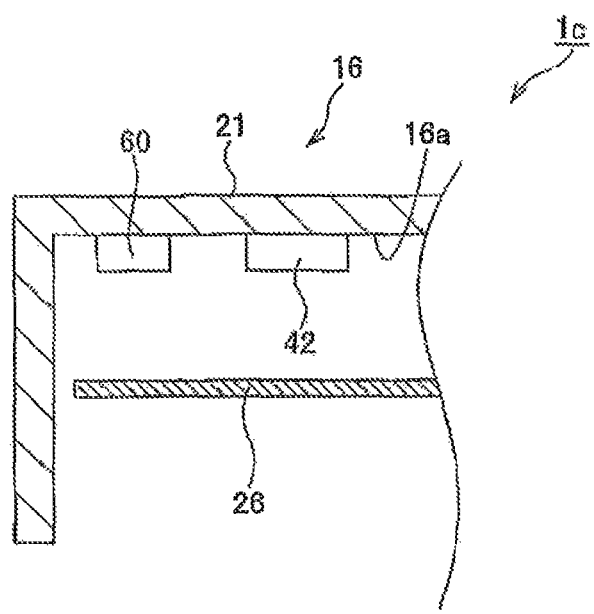
FIG. 6B is a sectional view of a main part in a state where a management board 26 is detached from a housing box 16.

FIGS. 6A and 6B are sectional views of the housing box 16. In particular, FIG. 6A shows a state where the management board 26 is attached to the housing box 16. FIG. 6B shows a state where the management board 26 is detached from the housing box 16.

As shown in FIGS. 6A and 6B, in this embodiment, in the housing box 16, the battery 42 is fastened to a ceiling surface 16a of the housing box 16 by means of adhesion or the like.

As shown in FIG. 6A, when the management board 26 is fastened to the housing box 16 through fastening members 60, terminals of the battery 42 are connected to a power supply line (not shown) which connects the battery 42 and the RTC 38 and a power supply line (not shown) which connects the battery 42 and the SRAM 33, such that power is normally supplied from the 42 to the RTC 38 and the SRAM 33.

Meanwhile, as shown in FIG. 6B, when the management board 26 and the fastening members 60 are disconnected from each other, and the management board 26 is detached from the housing box 16, connection between the battery 42 and the power supply line (not shown) which connects the battery 42 and the RTC 38 is mechanically shut off (the power supply path is mechanically shut off), and connection between the battery 42 and the power supply line (not shown) which connects the battery 42 and the SRAM 33 is mechanically shut off (the power supply path is mechanically shut off). Thus, the power supply from the battery 42 to the RTC 38 and the SRAM 33 is shut off.

When the power supply from the battery 42 to the RTC 38 is shut off, as described above, current date-and-time data 74 stored in the RTC volatile storage section 71 of the RTC 38 is erased, and on the basis of this situation, the actuation of the fiscal printer 1c is stopped after the fiscal printer 1c is powered on. Similarly, when the power supply from the battery 42 to the SRAM 33 is shut off, as described above, EJ write start address data 67 or fiscal write start address data 68 stored in the SRAM 33 is erased, and on the basis of this situation, the actuation of the fiscal printer 1c is stopped after the fiscal printer 1c is powered on. Therefore, it is possible to obtain the same effects as those in the first embodiment.

In this embodiment, when the management board 26 is detached from the housing box 16, connection between the battery 42 and the power supply line (not shown) which connects the battery 42 and the RTC 38 is mechanically shut off, and connection between the battery 42 and the power supply line (not shown) which connects the battery 42 and the SRAM 33 is mechanically shut off Meanwhile, when the management board 26 is detached from the housing box 16, connection between one power supply line 80 of the two power supply lines 80 and the battery 42 may be shut off. With this configuration, it is possible to stop the actuation of the fiscal printer 1c after being powered on, obtaining the same effects as described above.

As described above, in the fiscal printer 1c of this embodiment, if the management board 26 is detached from the housing box 16, the power supply line which connects the battery 42 and the RTC 38 is mechanically shut off, such that the power supply to the RTC 38 is shut off.

Accordingly, when the management board 26 is detached from the housing box 16, the power supply to the RTC 38 is shut off, and the current date and time measured by the RTC 38 is erased. For this reason, after the management board 26 is detached from the housing box 16, data representing the date and time divorced from the actual current date and time is output from the RTC 38 to the main control section 30. Thus, taking advantage of the date and time represented by data input from the RTC 38 being divorced from the actual date and time, the main control section 30 can perform effective processing against falsification which is done after the management board 26 is detached from the housing box 16, such as stopping the actuation of the fiscal printer 1c, after the management board 26 is detached from the housing box 16.

In the fiscal printer 1c of this embodiment, if the management board 26 is detached from the housing box 16, the power supply line which connects the battery 42 and the SRAM 33 is mechanically shut off, such that the power supply to the SRAM 33 is shut off.

Accordingly, when the management board 26 is detached from the housing box 16, the power supply to the SRAM 33 is shut off, and EJ write start address data 67 and fiscal write start address data 68 stored in the SRAM 33 is erased. For this reason, after the management board 26 is detached from the housing box 16, normal access to the EJ memory 34 or the like cannot be performed by the main control section 30 using EJ write start address data 67 and fiscal write start address data 68 stored in the SRAM 33, and on the basis of this situation, the main control section 30 can perform effective processing against falsification which is done after the management board 26 is detached from the housing box 16, such as stopping the actuation of the fiscal printer 1c after the management board 26 is detached from the housing box 16.

Fourth Embodiment

Next, a fiscal printer 1d of a fourth embodiment will be described.

In the following description, the same parts as those in the first embodiment are represented by the same reference numerals, and description thereof will be omitted.

In the above-described first embodiment, when the cover 22 is placed in the open state, the power supply line 80 which connects the battery 42 and the RTC 38 is mechanically shut off such that the power supply to the RTC 38 is shut off, and on the basis of this situation, the actuation of the fiscal printer 1 is stopped after the cover 22 is placed in the open state. Meanwhile, in this embodiment, when the management board 26 and the printer board 27 are disconnected from each other, a power supply line 86 (power supply path) which connects the battery 42 and the RTC 38 is mechanically shut off such that the power supply to the RTC 38 is shut off, and on the basis of this situation, the actuation of the fiscal printer 1d is stopped after the management board 26 and the printer board 27 are disconnected from each other.

Only when the management board 26 and the printer board 27 are connected to each other, it is possible to perform overall control of the fiscal printer 1d. Thus, at the time of the normal operation, the management board 26 and the printer board 27 are not disconnected from each other. When these boards are disconnected from each other, it is thought that a person with the purpose of falsification has disconnected these boards from each other for the purpose of improving ease of working or the like.

As a result, according to this embodiment, when the management board 26 and the printer board 27 are disconnected from each other, the actuation of the fiscal printer 1*d* is stopped. Thus, it is possible to restrain falsification by another person and, when the management board 26 and the printer board 27 are disconnected from each other, it is possible to reliably detect the disconnection. That is, the fiscal printer 1*d* performs effective processing against falsification.

Figure 7A:
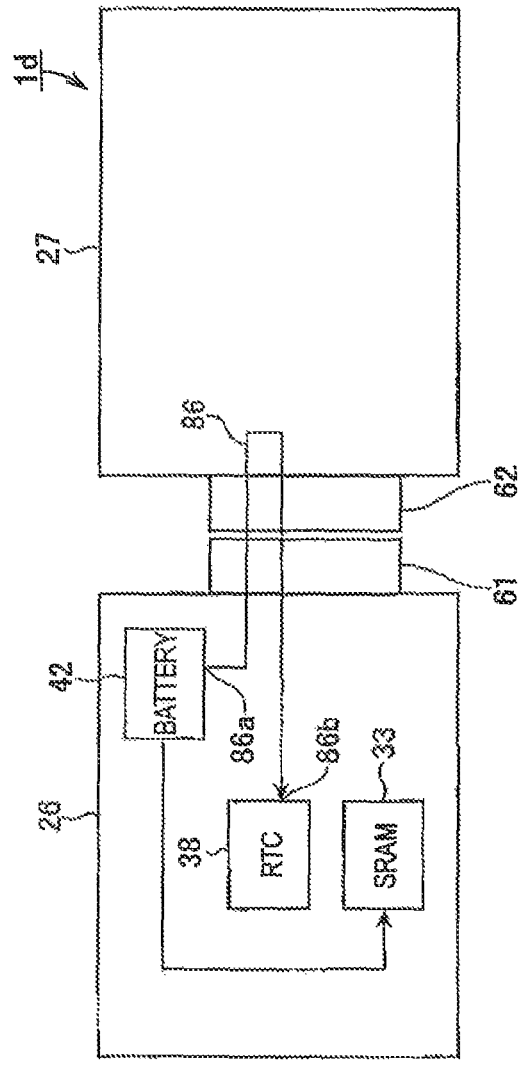
FIG. 7A is a diagram showing the configuration of a fiscal printer according to a fourth embodiment.

FIG. 7A is a diagram schematically showing the configuration of the management board 26 and the printer board 27 in this embodiment.

As shown in FIG. 7A, a power supply line 86 with one end 86*a* connected to the battery 42 extends to the printer board 27 through the management-side connector 61 and the printer-side connector 62, is bent, and again extends to the management board 26 through the printer-side connector 62 and the management-side connector 61. The other end 86*b* of the power supply line 86 is connected to the RTC 38. With such a configuration, the management-side connector 61 and the printer-side connector 62 are disconnected from each other, such that the management board 26 and the printer board 27 are disconnected from each other. In this case, the power supply line 86 is shut off at the connection portion of the management-side connector 61 and the printer-side connector 62. Thus, the power supply line 86 is mechanically shut off and the power supply to the RTC 38 is shut off.

When the management board 26 and the printer board 27 are disconnected from each other, and the power supply from the battery 42 to the RTC 38 is shut off, as described above, current date-and-time data 74 stored in the RTC volatile storage section 71 of the RTC 38 is erased, and on the basis of this situation, the actuation of the fiscal printer 1*d* is stopped after the fiscal printer 1*d* is powered on. As described in the above-described first embodiment, this processing is effective against falsification.

As described above, in this embodiment, if the management board 26 and the printer board 27 are disconnected from each other, the power supply line 86 is mechanically shut off, and the power supply to the RTC 38 is shut off.

Accordingly, when the management board 26 and the printer board 27 are disconnected from each other, the power supply to the RTC 38 is shut off, and the current date and time measured by the RTC 38 is erased. For this reason, after the management board 26 and the printer board 27 are disconnected from each other, data representing the date and time divorced from the actual current date and time is output from the RTC 38 to the main control section 30. Thus, taking advantage of the date and time represented by data input from the RTC 38 being divorced from the actual date and time, the main control section 30 can perform effective processing against falsification which is done after the management board 26 and the printer board 27 are disconnected from each other, such as stopping the actuation of the fiscal printer 1*d* after the management board 26 and the printer board 27.

Fifth Embodiment

Next, a fiscal printer 1*e* of a fifth embodiment will be described.

In the following description, the same parts as those in the first embodiment are represented by the same reference numerals, and description thereof will be omitted.

In the above-described first embodiment, when the cover 22 is placed in the open state, the power supply line 80 which connects the battery 42 and the RTC 38 is mechanically shut off such that the power supply to the RTC 38 is shut off, and on the basis of this situation, the actuation of the fiscal printer 1 is stopped after the cover 22 is placed in the open state. Meanwhile, in this embodiment, when the management board 26 and the printer board 27 are disconnected from each other, a power supply line 87 (power supply path) which connects the battery 42 and the SRAM 33 is mechanically shut off such that the power supply to the SRAM 33 is shut off, and on the basis of this situation, the actuation of the fiscal printer 1*e* is stopped after the management board 26 and the printer board 27 are disconnected from each other.

Only when the management board 26 and the printer board 27 are connected to each other, it is possible to perform overall control of the fiscal printer 1*e*. Thus, at the time of the normal operation, the management board 26 and the printer board 27 are not disconnected from each other. When these boards are disconnected from each other, it is thought that a person with the purpose of falsification has disconnected these boards from each other for the purpose of improving ease of working or the like.

As a result, according to this embodiment, when the management board 26 and the printer board 27 are disconnected from each other, the actuation of the fiscal printer 1*e* is stopped. Therefore, it is possible to restrain falsification by another person and, when the management board 26 and the printer board 27 are disconnected from each other, it is possible to reliably detect the disconnection. That is, the fiscal printer 1*e* performs effective processing against falsification.

Figure 7B:
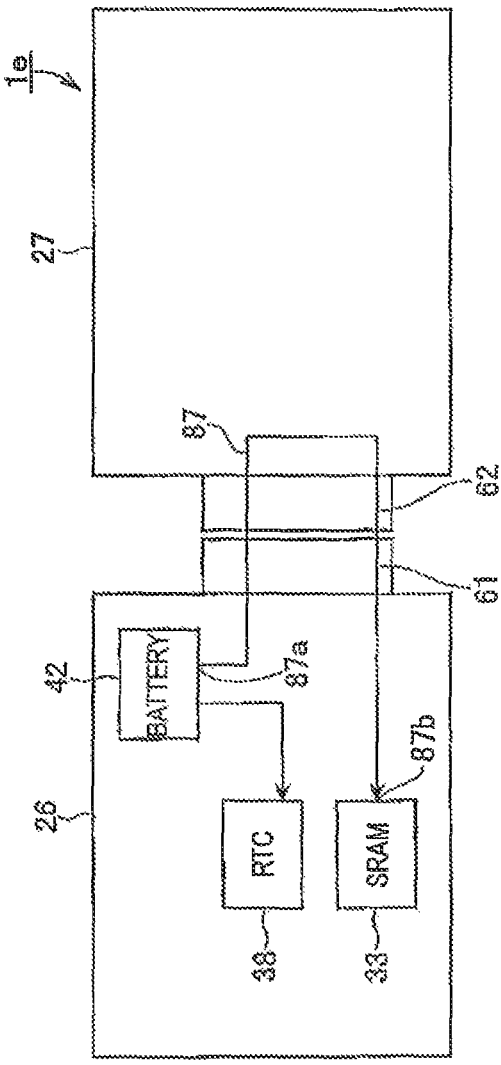
FIG. 7B is a diagram showing the configuration of a fiscal printer according a fifth embodiment.

FIG. 7B is a diagram schematically showing the configuration of the management board 26 and the printer board 27 in this embodiment.

As shown in FIG. 7B, a power supply line 87 with one end 87*a* connected to the battery 42 extends to the printer board 27 through the management-side connector 61 and the printer-side connector 62, is bent, and again extends to the management board 26 through the printer-side connector 62 and the management-side connector 61. The other end 87*b* of the power supply line 87 is connected to the SRAM 33. With such a configuration, the management-side connector 61 and the printer-side connector 62 are disconnected from each other, such that the management board 26 and the printer board 27 are disconnected from each other. In this case, the power supply line 87 is shut off at the connection portion between the management-side connector 61 and the printer-side connector 62. Thus, the power supply line 87 is mechanically shut off and the power supply to the SRAM 33 is shut off.

When the management board 26 and the printer board 27 are disconnected from each other, and the power supply from the battery 42 to the SRAM 33 is shut off, as described above, EJ write start address data 67 or fiscal write start address data 68 stored in the SRAM 33 is erased, thus the actuation of the fiscal printer 1*e* is stopped after being powered on. As described in the above-described first embodiment, this processing is effective against falsification.

As described above, in this embodiment, if the management board 26 and the printer board 27 are disconnected from each other, the power supply line 87 is mechanically shut off, and the power supply to the SRAM 33 is shut off.

Accordingly, when the management board 26 and the printer board 27 are disconnected from each other, the power supply to the SRAM 33 is shut off, the power supply to the SRAM 33 is shut off, and EJ write start address data 67 and fiscal write start address data 68 stored in the SRAM 33 are erased. For this reason, after the management board 26 and the printer board 27 are disconnected from each other, normal access to the EJ memory 34 or the like cannot be performed by the main control section 30 using EJ write start address data 67 stored in the SRAM 33, and on the basis of this situation, the main control section 30 can perform effective processing against falsification which is done after the management board 26 and the printer board 27 are disconnected from each other, such as stopping the actuation of the fiscal printer 1e after the management board 26 and the printer board 27 are disconnected from each other. In this ease, an indication that an error or abnormality occurs may be displayed or notified. The trace of falsification is retained.

Sixth Embodiment

Next, a fiscal printer if of a sixth embodiment will be described.

In the following description, the same parts as those in the first embodiment are represented by the same reference numerals, and description thereof will be omitted.

Figure 8:
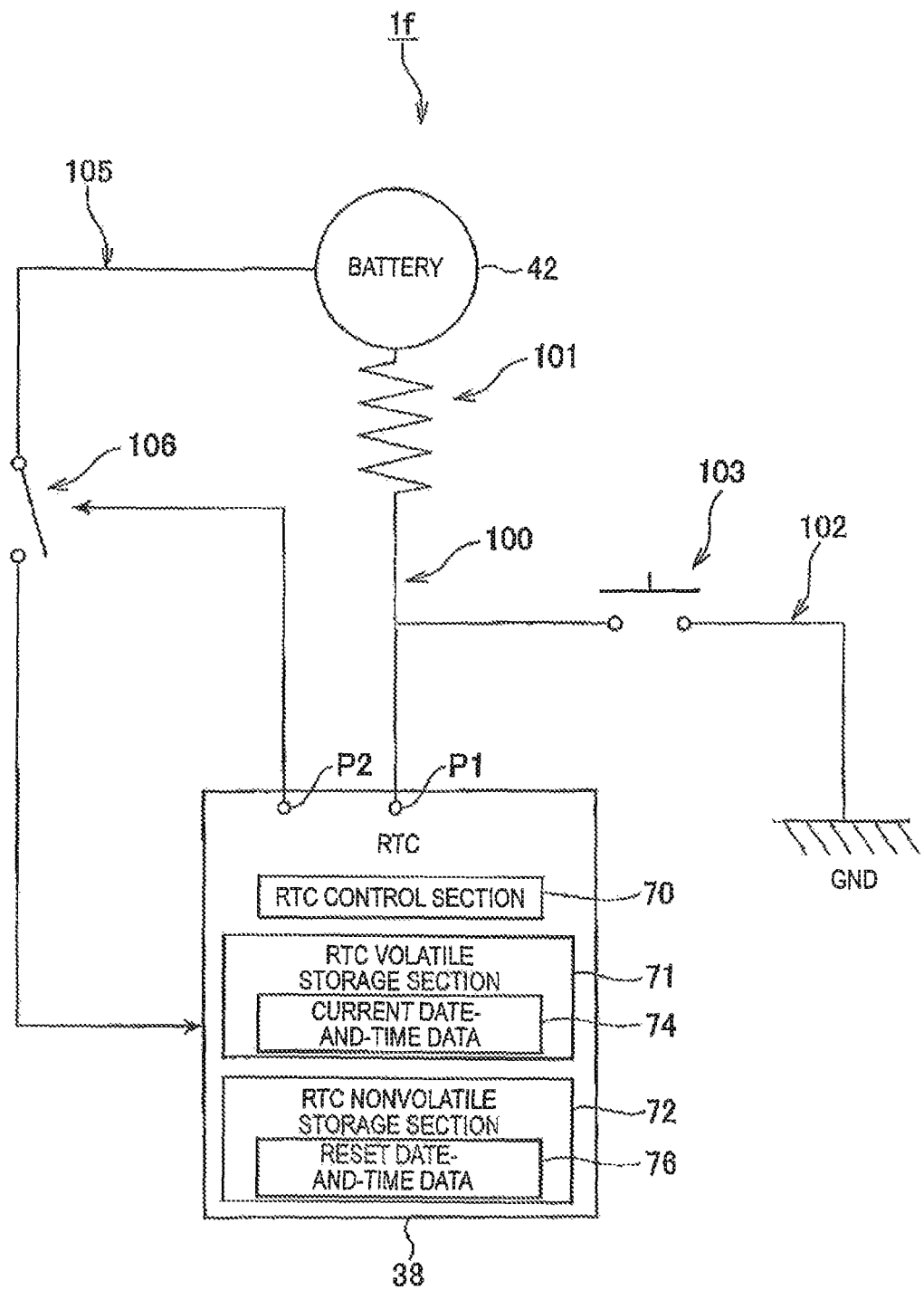
FIG. 8 is a circuit configuration diagram of a fiscal printer according to a sixth embodiment.

FIG. 8 is a diagram schematically showing the circuit configuration of the battery 42 and the RTC 38 in the fiscal printer If of this embodiment in an appropriate mode for describing the invention.

A signal line 100 is provided between the battery 42 and a port P1 of the RTC 38. The signal line 100 has a pull-up resistor 101. A ground line 102 which is grounded is connected to the signal line 100 on the RTC 38 side, not the pull-up resistor 101 side. The ground line 102 has a switch-type sensor 103. The switch-type sensor 103 is a normally closed switch which is in the ON state (closed state) when the cover 22 is in the closed state and is in the OFF state (open state) when the cover 22 is in the open state.

With such a configuration, a voltage which is lower than a predetermined threshold value is applied to the port P1 of the RTC 38 when the cover 22 is in the closed state (the switch-type sensor 103 is turned on), and if the cover 22 is placed in the open state (the switch-type sensor 103 is turned off), a voltage which is higher than the predetermined threshold value is applied to the port P1 of the RTC 38. Hereinafter, the application of a voltage lower than the predetermined threshold value to the port of the RTC 38 is referred to as a low signal being output to the port, and the application of a voltage higher than the predetermined threshold value to the port is referred to as a high signal being output to the port.

In this embodiment, the switch-type sensor 103 functions as a detection section which detects the open state of the cover 22 and also outputs a signal indicating the detection of the open state to the RTC 38.

A power supply line 105 (power supply path) is provided between the battery 42 and the RTC 38 to supply power from the battery 42 to the RTC 38. The power supply line 105 has a power supply switch 106 (switch) which is controlled to be turned on/off by the RTC 38. While the RTC 38 outputs a control signal through a port P2 to turn on the power supply switch 106, power is supplied from the battery 42 to the RTC 38. When the RTC 38 outputs a control signal through the port P2 to turn off the power supply switch 106, the power supply from the battery 42 to the RTC 38 is shut off When the fiscal printer if is powered off or when the housing box 16 is detached from the printer main body 14, if the power supply from the battery 42 to the RTC 38 is shut off, the whole power supply to the RTC 38 is shut off. Thus, current date-and-time data 74 stored in the RTC volatile storage section 71 is erased, and the subsequent actuation of the RTC 38 is stopped.

Figure 9:
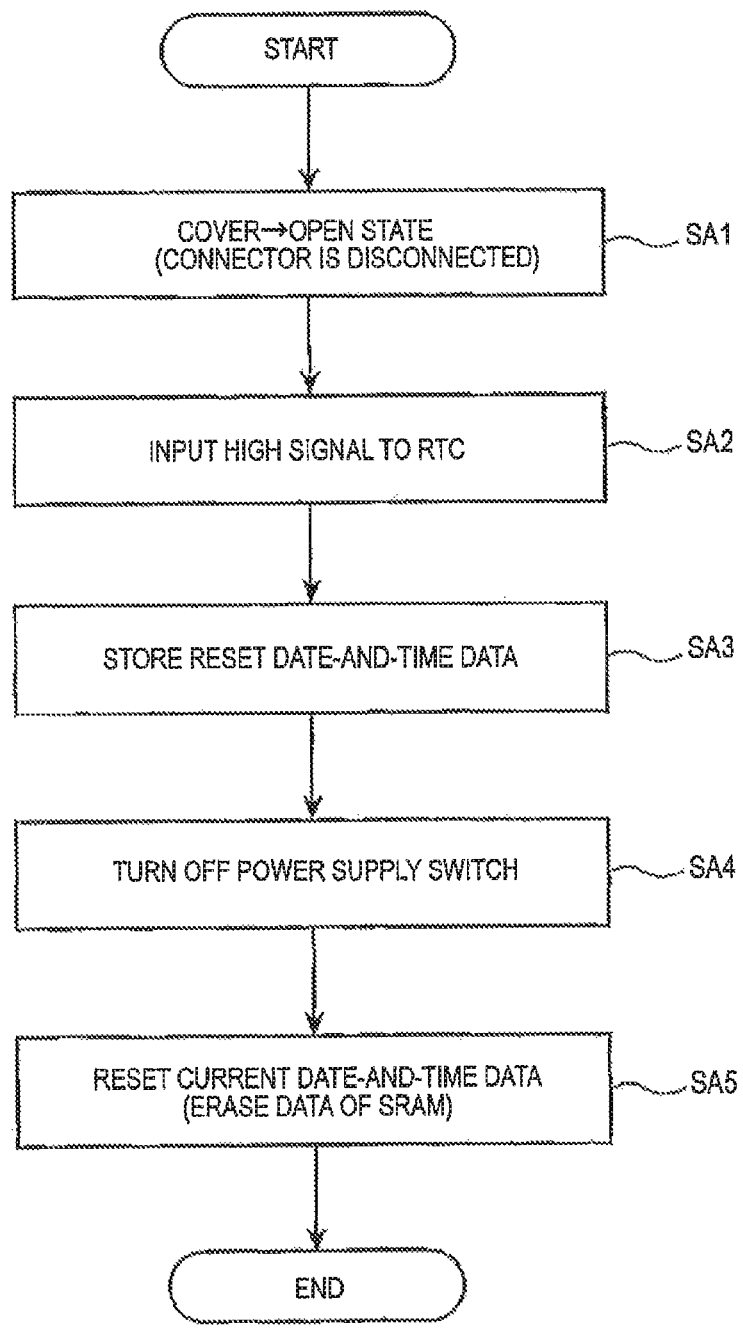
FIG. 9 is a flowchart showing the operation of a fiscal printer.

FIG. 9 is a flowchart showing the operation of the fiscal printer if when the cover 22 is detached.

In the following operation, when it is detected that the cover 22 is in the open state, the RTC 38 functions as a reset section in which, when the power supply to the RTC 38 is shut off, current date-and-time data 74 stored in the RTC volatile storage section 71 is erased, and the date and time measured by the RTC 38 is erased.

For the following operation, it is assumed that the housing box 16 is detached from the printer main body 14. That is, power is supplied from the battery 42 to the RTC 38 without using the commercial power source.

First, the cover 22 of the housing box 16 is placed in the open state (Step SA1). When the cover 22 of the housing box 16 is placed in the open state, the management board 26 or the printer board 27 is exposed, enabling physical access to these boards. Thus, when the cover 22 of the housing box 16 is placed in the open state, write receipt data 11 or daily sales data 12 may be falsified.

If the cover 22 of the housing box 1$ is placed in the open state, the high signal is output from the switch-type sensor 103 to the port P1 of the RTC 38 (Step SA2).

If the high signal is input to the port P1, the RTC control section 70 acquires current date-and-time data 74 from the RTC volatile storage section 71 and writes the date and time represented by acquired current date-and-time data 74 as reset date-and-time data 76 in the RTC nonvolatile storage section 72 (Step SA3). Reset date-and-time data 76 is data which represents the date and time at which the cover 22 is in the open state. The RTC nonvolatile storage section 72 is a nonvolatile memory and holds stored data even after the power supply to the RTC 38 is shut off.

Next, the RTC control section 70 outputs a control signal through the port P2 to turn off the power supply switch 106 (Step SA4). Thus, the power supply from the battery 42 to the RTC 38 is shut off, current date-and-time data 74 stored in the RTC volatile storage section 71 is erased, and the actuation of the RTC 38 is stopped (Step SA5).

In this way, in this embodiment, when the cover 22 is placed in the open state, the power supply to the RTC 38 is shut off, and current date-and-time data 74 stored in the RTC volatile storage section 71 is erased.

After current date-and-time data 74 is erased, the cover 22 is again placed in the closed state and the housing box 16 is normally attached to the printer main body 14. Simultaneously, electrical conduction is normally provided between each board housed in the housing box 16 and the mechanism or the device for issuing a receipt, and the fiscal printer if is powered on. During this procedure, the operation of the fiscal printer if will be described. In this case, the RTC 38 is reset and starts to operate from an initial value.

As described above, in this embodiment, when data is written into the EJ memory 34 or the fiscal memory 37, the main control section 30 compares the date and time represented by the last write date-and-time data 66 stored in the ROM 32 with the date and time represented by data input from the RTC 38, and when the date and time represented by the last write date-and-time data 66 stored in the ROM 32 is temporally later than the date and time represented by data input from the RTC 38, determines that an RTC error occurs and then stops the actuation of the fiscal printer 1f.

As a result, the power supply to the RTC 38 is temporarily shut off due to the cover 22 being placed in the open state, and current date-and-time data 74 stored in the RTC volatile storage section 71 is erased. In this case, in comparison of the date and time at the time of writing of data by the main control section 30, it is determined that the date and time represented by the last write date-and-time data 66 stored in the ROM 32 is temporally later than the date and time represented by data input from the RTC 38, then, the main control section 30 stops the actuation of the fiscal printer if Thus, it becomes impossible to print a receipt or the like.

In this way, in this embodiment, after the housing box 16 is detached from the printer main body 14, when the cover 22 is placed in the open state, in other words, when access is possible to data stored in the EJ memory 34 or the fiscal memory 37 for the purpose of falsification, the operation of the fiscal printer 1f is stopped. Thus, it is possible to restrain the cover 22 from being placed in the open state for the purpose of falsification and, when the cover 22 is placed in the open state, it is possible to reliably detect the open state of the cover 22. That is, the fiscal printer 1f performs effective processing against falsification.

In this embodiment, reset date-and-time data 76 which represents the date and time at which the cover 22 is placed in the open state is stored in the RTC nonvolatile storage section 72. Reset date-and-time data 76 can be used as useful information for specifying the date and time at which the cover 22 is placed in the open state.

As described above, the fiscal printer 1f of this embodiment includes a switch-type sensor 103 (detection section) which detects the open state of the cover 22, and the RTC 38 which functions as a reset section and, when the open state of the cover 22 is detected, erases current date-and-time data 74 stored in the RTC volatile storage section 71 to reset the current date and time measured by the RTC 38.

Accordingly, when the cover 22 of the housing box 16 is placed in the open state, the current date and time measured by the RTC 38 is erased. For this reason, after the cover 22 of the housing box 16 is placed in the open state, data representing the date and time divorced from the actual current date and time is output from the RTC 38 to the main control section 30. Thus, taking advantage of the date and time represented by data input from the real-time clock being divorced from the actual date and time, the main control section 30 can perform effective processing against falsification which is done after the cover 22 is placed in the open state, such as stopping the actuation of the fiscal printer 1f.

In this embodiment, in the RTC 38 which functions as a reset section, when the open state of the cover 22 is detected, the power supply from the battery 42 to the RTC 38 is shut off, such that current date-and-time data 74 stored in the RTC volatile storage section 71 is erased.

With this configuration, when the open state of the cover 22 is detected, the power supply to the RTC 38 is shut off, reliably erasing current date-and-time data 74 stored in the RTC volatile storage section 71.

In particular, in some countries, the law or regulations require that EJ write date-and-time data 78 and write receipt data 11 are stored in association with each other, and fiscal write date-and-time data 79 and daily sales data 12 are stored in association with each other. The fiscal printer 1f which is used in these countries necessarily includes the RTC 38 which is a member necessary for generating EJ write date-and-time data 78 and fiscal write date-and-time data 79. The RTC 38 has a feature that power is supplied from the battery 42 even when the fiscal printer 1f is powered off, a feature that, when the power supply is shut off, the current date and time to be measured is erased, and a feature that a circuit is provided to/from which various control signals can be input/output. In this embodiment, taking advantage of the above-described condition and the features of the RTC 38, even when the fiscal printer 1f is powered off or even when the housing box 16 is detached from the printer main body 14, if the cover 22 is placed in the open state, current date-and-time data 74 stored in the RTC volatile storage section 71 is reliably erased.

In this embodiment, the power supply switch 106 which is controlled by the RTC 38 is provided in the power supply line 105 which connects the battery 42 and the RTC 38. When the cover 22 is placed in the open state, the switch-type sensor 103 outputs the signal (high signal) indicating the open state of the cover 22 to the RTC 38. When the signal is input, the RTC 38 which functions as a reset section controls the power supply switch 106 to shut off the power supply from the battery 42 to the RTC 38.

Accordingly, when the cover 22 is placed in the open state, the power supply to the RTC 38 is shut off by the power supply switch 106 which is controlled by the RTC 38, reliably erasing current date-and-time data 74 stored in the RTC volatile storage section 71.

Seventh Embodiment

Next, a fiscal printer 1g of a seventh embodiment will be described.

In the following description, the same parts as those in the first and sixth embodiments are represented by the same reference numerals, and description thereof will be omitted.

Figure 10:
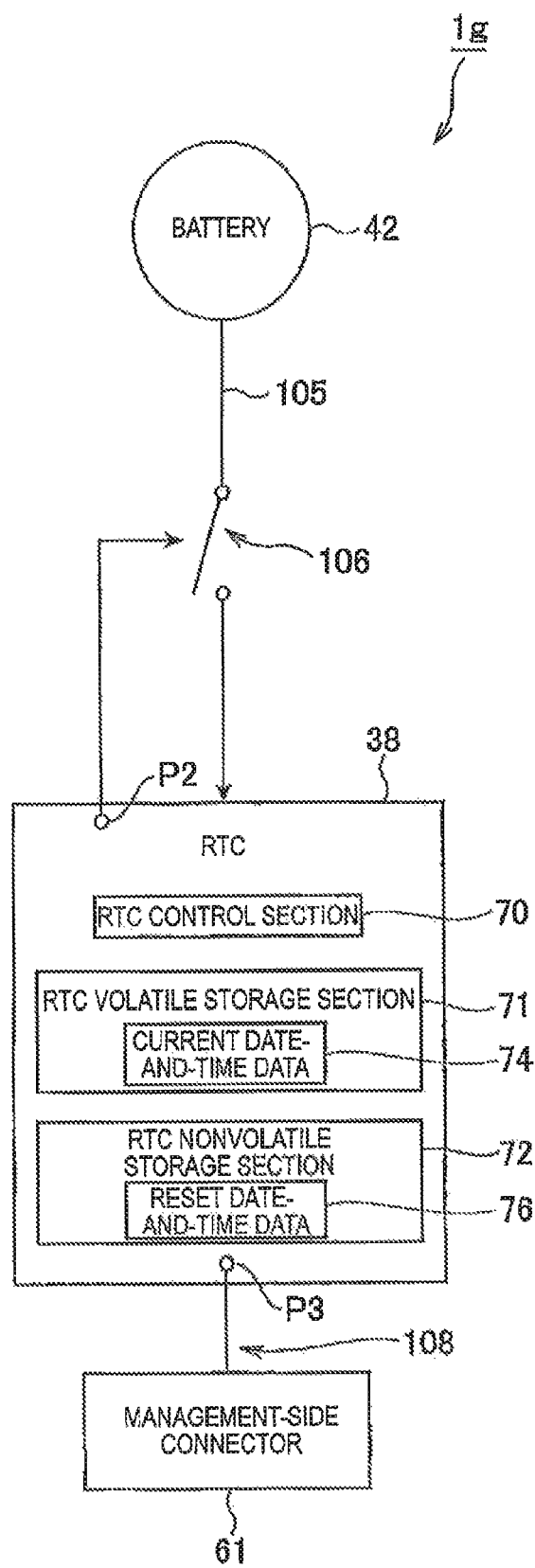
FIG. 10 is a circuit configuration diagram of a fiscal printer according to a seventh embodiment.

FIG. 10 is a diagram schematically showing the circuit configuration of the battery 42, the RTC 38, and the management-side connector 61 in the fiscal printer 1g of this embodiment in an appropriate mode for describing the invention.

In the above-described sixth embodiment, when the cover 22 of the housing box 16 is placed in the open state, the power supply from the battery 42 to the RTC 38 is shut off, and current date-and-time data 74 stored in the RTC volatile storage section 71 is erased. Meanwhile, in this embodiment, when the management board 26 and the printer board 27 are disconnected from each other, the power supply from the battery 42 to the RTC 38 is shut off, and current date-and-time data 74 stored in the RTC volatile storage section 71 is erased.

Specifically, as shown in FIG. 10, the management-side connector 61 and a port P3 of the RTC 38 are connected to each other through a signal line 108. When the management-side connector 61 and the printer-side connector 62 are connected to each other, a low signal is output from the management-side connector 61 to the port P3 of the RTC 38. Meanwhile, when the management-side connector 61 and the printer-side connector 62 are disconnected from each other, and the management board 26 and the printer board 27 are disconnected from each other, the high signal is output from the management-side connector 61 to the port P3 of the RTC 38.

Next, when the management board 26 and the printer board 27 are disconnected from each other, the operation of the fiscal printer 1g will be described with reference to FIG. 9.

In the following operation, the management-side connector 61 functions as a detection section which detects that the management board 26 and the printer board 27 are disconnected from each other. The RTC 38 functions as a reset section which erases current date-and-time data 74 stored in the RTC volatile storage section 71 to erase the time measured by the RTC 38.

Referring to FIG. 9, first, the management board 26 and the printer board 27 are disconnected from each other (Step SA1). Although in the above-described sixth embodiment, the caser 22 is in the open state in Step SA1, this embodiment is different from the sixth embodiment in terms of Step SA1.

If the management board 26 and the printer board 27 are disconnected from each other, the high signal is output from the management-side connector 61 to the port P3 of the RTC 38 (Step SA2).

If the high signal is input to the port P3, the RTC control section 70 acquires current date-and-time data 74 from the RTC volatile storage section 71, and writes the date and time represented by acquired current date-and-time data 74 as reset date-and-time data 76 in the RTC nonvolatile storage section 72 (Step SA3). In this case, reset date-and-time data 76 is data which represents the date and time at which the management board 26 and the printer board 27 are disconnected from each other. Reset date-and-time data 76 is used as useful data for specifying the date and time at which the management board 26 and the printer board 27 are disconnected from each other. The RTC nonvolatile storage section 72 is a nonvolatile memory, and holds data stored even after the power supply to the RTC 38 is shut off.

Next, the RTC control section 70 outputs a control signal through the port P2 to turn off the power supply switch 106 (Step SA4). Thus, the power supply from the battery 42 to the RTC 38 is shut off, current date-and-time data 74 stored in the RTC volatile storage section 71 is erased, and the actuation of the RTC 38 is stopped (Step SA5).

In this way, in this embodiment, when the management board 26 and the printer board 27 are disconnected from each other, current date-and-time data 74 stored in the RTC volatile storage section 71 is erased. When current date-and-time data 74 is erased, similarly to the above-described first embodiment, the actuation of the fiscal printer 1g is stopped.

Only when the management board 26 and the printer board 27 are connected to each other, it is possible to perform overall control of the fiscal printer 1g. Thus, at the time of the normal operation, the management board 26 and the printer board 27 are not disconnected from each other. When these boards are disconnected from each other, it is thought that a person with the purpose of falsification has disconnected these boards from each other for the purpose of improving ease of working or the like.

As a result, according to this embodiment, when the management board 26 and the printer board 27 are disconnected from each other, in other words, when falsification is likely to have been done on data stored in the EJ memory 34 or the fiscal memory 37, the operation of the fiscal printer 1g is stopped. Thus, it is possible to restrain falsification by another person and, when the cover 22 is placed in the open state, it is possible to reliably detect the open state of the cover 22. That is, the fiscal printer 1g performs effective processing against falsification.

As described above, the fiscal printer 1g of this embodiment includes the management-side connector 61 which detects disconnection between the management board 26 and the printer board 27, and the RTC 38 which functions as a reset section which, when it is detected that the management board 26 and the printer board 27 are disconnected from each other, erases current date-and-time data 74 stored in the RTC volatile storage section 71 to erase the current date and time measured by the RTC 38.

Accordingly, when the management board 26 and the printer board 27 are disconnected from each other, the current date and time measured by the RTC 38 is erased. For this reason, after the management board 26 and the printer board 27 are disconnected from each other, data representing the date and time divorced from the actual current date and time is output from the RTC 38 to the main control section 30. Thus, taking advantage of the date and time represented by data input from the RTC 38 being divorced from the actual date and time, the main control section 30 can perform effective processing against falsification which is done after the management board 26 and the printer board 27 are disconnected from each other, such as stopping the actuation of the fiscal printer 1b.

Eighth Embodiment

Next, a fiscal printer 1h of an eighth embodiment will be described.

In the following description, the same parts as those in the first and sixth embodiments are represented by the same reference numerals, and description thereof will be omitted.

Figure 11:
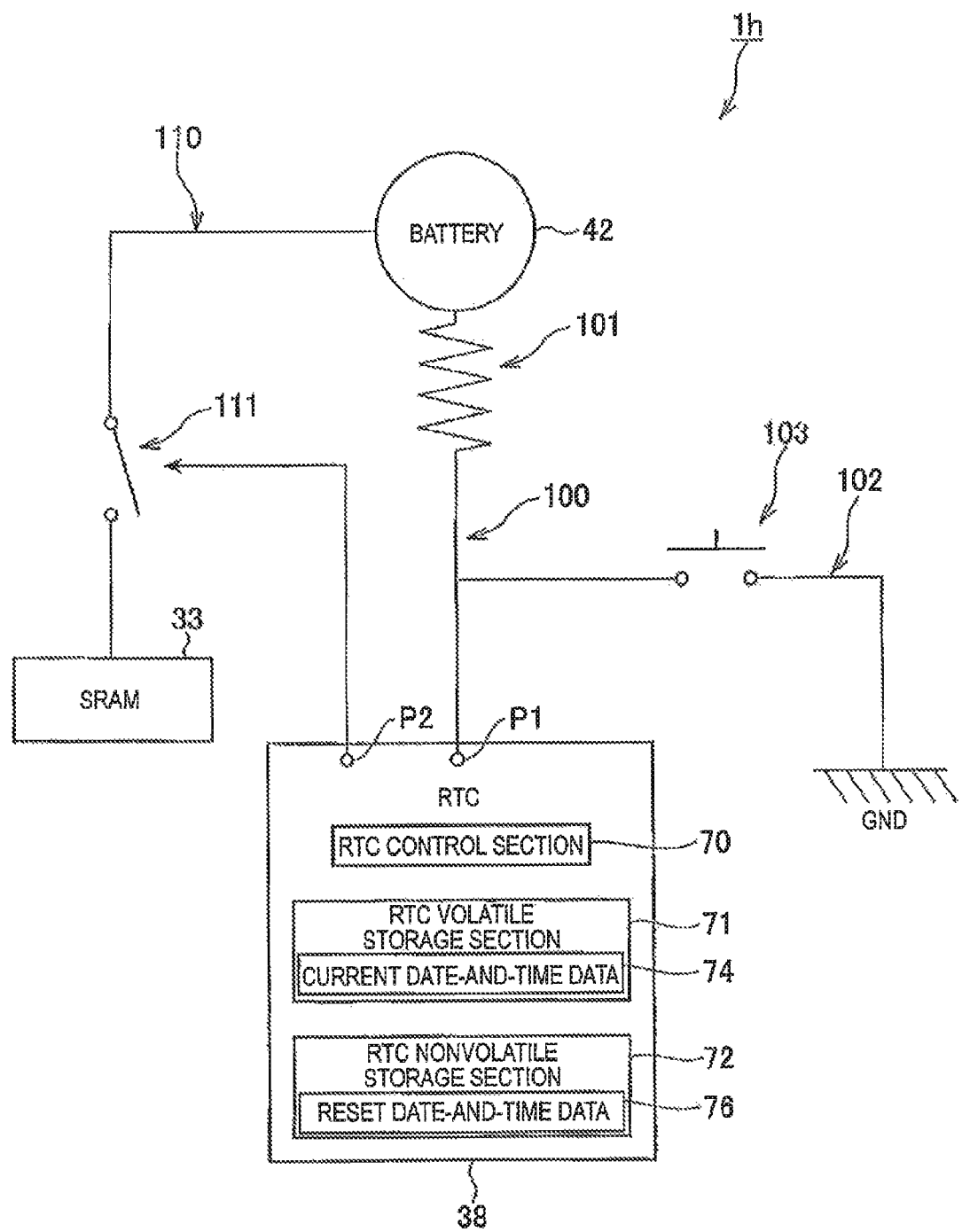
FIG. 11 is a circuit configuration diagram of a fiscal printer according to an eighth embodiment.

FIG. 11 is a diagram schematically showing the circuit configuration of the battery 42, the RTC 38, and the SRAM 33 in an appropriate mode for describing the invention. Although in FIG. 11, the power supply line 105 is not shown which is provided between the battery 42 and the RTC 38, in this embodiment, no power supply switch 106 is provided in the power supply line 105, and when fiscal printer 1h is powered off, power is constantly supplied from the battery 42 to the RTC 38.

As shown in FIG. 11, a power supply line 110 is provided between the battery 42 and the SRAM 33 to supply power from the battery 42 to the SRAM 33. The power supply line 110 has a power supply switch 111 which is controlled to be turned on/off by the RTC 38. While the RTC 38 outputs a control signal through the port P2 to turn on the power supply switch 111, power is supplied from the battery 42 to the SRAM 33. Meanwhile, when the RTC 38 outputs a control signal through the port P2 to turn off the power supply switch 111, the power supply from the battery 42 to the SRAM 33 is shut off. When the fiscal printer 1 is powered off or when the housing box 16 is detached from the printer main body 14, if the power supply from the battery 42 to the SRAM 33 is shut off, the whole power supply to the SEAM 33 is shut off. Thus, data stored in the SRAM 33 serving as a volatile memory is erased. Erased data includes EJ write start address data 67 and fiscal write start address data 68.

Next, when the cover 22 is placed in the open state, the operation of the fiscal printer 1h will be described with reference to FIG. 9. In the following description, the switch-type sensor 103 functions as a detection section which detects the open state of the cover 22 and outputs a signal indicating the detection of the open state to the RTC 38. The RTC 38 functions as a data erasure section which erases data stored in the SRAM 33.

Referring to FIG. 9, first, the cover 22 of the housing box 16 is placed in the open state (Step SA1). When the cover 22 of the housing box 16 is placed in the open state, the management board 26 or the printer board 27 is exposed, enabling physical access to these boards. Thus, when the cover 22 of the housing box 16 is placed in the open state, write receipt data 11 or daily sales data 12 may be falsified.

If the cover 22 of the housing box 16 is placed in the open state, the high signal output from the switch-type sensor 103 to the port P1 of the RTC 38 (Step SA2).

If the high signal is input to the port P1, the RTC control section 70 acquires current date-and-time data 74 from the RTC volatile storage section 71, and writes the date and time represented by acquired current date-and-time data 74 as reset date-and-time data 76 in the RTC nonvolatile storage section 72 (Step SA3). Reset date-and-time data 76 is data which represents the date and time at which the cover 22 is placed in the open state, and is used as useful information for specifying the date and time at which the cover 22 is placed in the open state.

Next, the RTC control section 70 outputs a control signal through the port P2 to turn off the power supply switch 111 (Step SA4). Thus, the power supply from the battery 42 to the SRAM 33 is shut off, and data, such as EJ write start address data 67 or fiscal write start address data 68 stored in the SRAM 33, is erased (Step SA5).

In this way, in this embodiment, when the cover 22 is placed in the open state, EJ write start address data 67 or fiscal write start address data 68 stored in the SRAM 33 is erased. Meanwhile, as described above, when these kinds of data are erased, if the fiscal printer 1b is powered on, it is determined that there is an SRAM error, and the subsequent actuation of the fiscal printer 1h is stopped. Therefore, it is possible to obtain the same effects as those in the first embodiment.

As described above, the fiscal printer 1b of this embodiment includes the switch-type sensor 103 (detection section) which detects the open state of the cover 22 and outputs the signal indicating the detection of the open state to the RTC 38, and the RTC 38 (data erasure section) which, when the open state of the cover 22 is detected, erases data stored in the SRAM 33.

Accordingly, when the cover 22 of the housing box 16 is placed in the open state, EJ write start address data 67 or fiscal write start address data 68 stored in the SRAM 33 is erased. For this reason, after the cover 22 of the housing box 16 is placed in the open state, normal access to the EJ memory 34 or the fiscal memory 37 cannot be performed by the main control section 30 using these kinds of data stored in the SRAM 33, and on the basis of this situation, the main control section 30 can perform effective processing against falsification which is done after the cover 22 is placed in the open state, such as stopping the actuation of the fiscal printer 1h after the cover 22 is placed in the open state.

In this embodiment, in the RTC 38 which functions as a data erasure section, when the open state of the cover 22 is detected, the power supply from the battery 42 to the SRAM 33 is shut off, such that data stored in the SRAM 33 is erased.

Accordingly, when the open state of the cover 22 is detected, power to the SRAM 33 is shut off, making it possible to reliably erase data stored in the SRAM 33.

In particular, in some countries, the law or regulations requires that EJ write date-and-time data 78 and write receipt data ii are stored in association with each other, and fiscal write date-and-time data 79 and daily sales data 12 are stored in association with each other. The fiscal printer 111 which is used in these countries necessarily includes the RTC 38 which is a member necessary for generating EJ write date-and-time data 78 and fiscal write date-and-time data 79. The RTC 38 has a feature that power is supplied from the battery 42 even when the fiscal printer 111 is powered off, a feature that, when the power supply is shut off, the current date and time to be measured is erased, and a feature that a circuit is provided to/from which various control signals can be input/output. In this embodiment, taking advantage of the above-described condition and the features of the RTC 38, even when the fiscal printer 111 is powered off or even when the housing box 16 is detached from the printer main body 14, if the cover 22 is placed in the open state, data stored in the SRAM 33 is reliably erased.

In this embodiment, the power supply switch 111 which is controlled by the RTC 38 is provided in the power supply line 110 which connects the battery 42 and the SRAM 33. If the open state of the cover 22 is detected, the switch-type sensor 103 outputs the signal indicating the detection of the open state to the RTC 38. When the signal is input, the RTC 38 which functions as a data erasure section controls the power supply switch 111 to shut off the power supply from the battery 42 to the SRAM 33.

Accordingly, when the cover 22 is placed in the open state, power to the SRAM 33 is shut off by the power supply switch 111 which is controlled by the RTC 38, making it possible to reliably erase data stored in the SRAM 33.

Ninth Embodiment

Next, a fiscal printer 1i of a ninth embodiment will be described.

In the following description, the same parts as those in the first and sixth embodiments are represented by the same reference numerals, and description thereof will be omitted.

Figure 12:
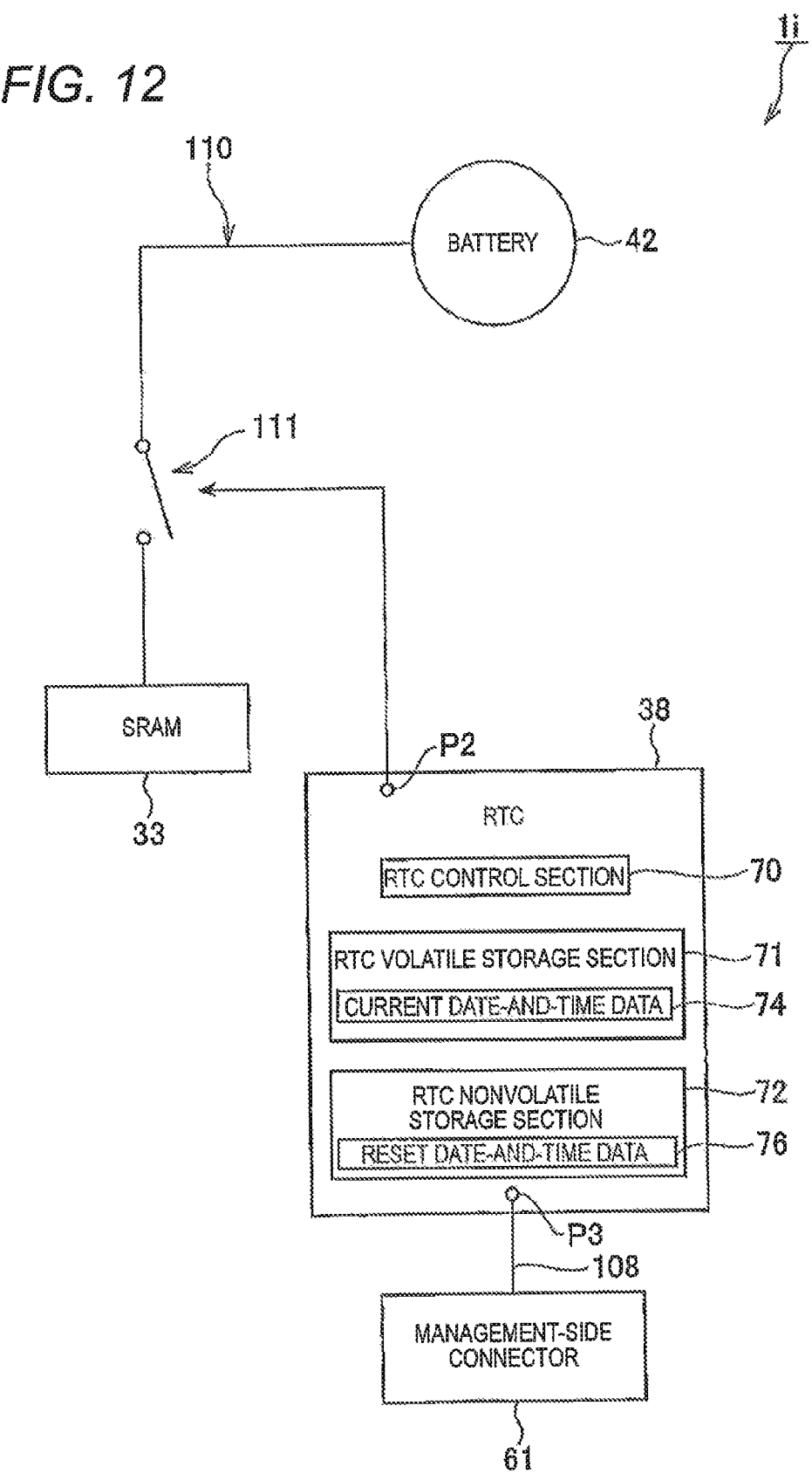
FIG. 12 is a circuit configuration diagram of a fiscal printer according to a ninth embodiment.

FIG. 12 is a diagram schematically showing the circuit configuration of the battery 42, the RTC 38, the SRAM 33, and the management-side connector 61 in the fiscal printer 1i of the ninth embodiment in an appropriate mode for describing the invention.

In this embodiment, when the management board 26 and the printer board 27 are disconnected from each other, the power supply from the battery 42 to the SRAM 33 is shut off, and EJ write start address data 67 and fiscal write start address data 68 stored in the SRAM 33 are erased.

Specifically, as shown in FIG. 12, the management-side connector 61 and the port P3 of the RTC 38 are connected to each other through the signal line 108. When the management-side connector 61 and the printer-side connector 62 are connected to each other, the low signal is output from the management-side connector 61 to the port P3 of the RTC 38. Meanwhile, when the management-side connector 61 and the printer-side connector 62 are disconnected from each other, and the management board 26 and the printer board 27 are disconnected from each other, the high signal is output from the management-side connector 61 to the port P3 of the RTC 38. The power supply line 110 is provided between the battery 42 and the SRAM 33 to supply power from the battery 42 to the SRAM 33. The power supply line 110 has the power supply switch 111 which is controlled to be turned on/off by the RTC 38. When the RTC 38 outputs a control signal through the port P2 to turn on the power supply switch 111, power is supplied from the battery 42 to the SRAM 33. Meanwhile, when the RTC 38 outputs a control signal through the port P2 to turn off the power supply switch 111, the power supply from the battery 42 to the SRAM 33 is shut off.

Next, when the management board 26 and the printer board 27 are disconnected from each other, the operation of the fiscal printer 1i will be described with reference to FIG. 9.

In the following operation, the management-side connector 61 functions as a detection section which detects the disconnection between the management board 26 and the printer board 27, and the RTC 38 functions as a data erasure section which, when it is detected that the management board 26 and the printer board 27 are disconnected from each other, erases data stored in the SRAM 33.

Referring to FIG. 9, first, the management board 26 and the printer board 27 are disconnected from each other (Step SA1). Although in the above-described first embodiment, the cover 22 is placed in the open state in Step SA1, this embodiment is different from the first embodiment in terms of Step SA1.

If the management board 26 and the printer board 27 are disconnected from each other, the high signal is output from the management-side connector 61 to the port P3 of the RTC 38 (Step SA2).

If the high signal is input to the port P3, the RTC control section 70 acquires current date-and-time data 74 from the RTC volatile storage section 71, and writes the date and time represented by acquired current date-and-time data 74 as reset date-and-time data 76 in the RTC nonvolatile storage section 72 (Step SA3). In this case, reset date-and-time data 76 is data which represents the date and time at which the management board 26 and the printer board 27 are disconnected from each other. Reset date-and-time data 76 is used as useful data for specifying the date and time at which the management board 26 and the printer board 27 are disconnected from each other.

Next, the RTC control section 70 outputs a control signal through the port P2 to turn off the power supply switch 111 (Step SA4). Thus, the power supply from the battery 42 to the SRAM 33 is shut off, and data, such as EJ write start address data 67 or fiscal write start address data 68 stored in the SRAM 33, is erased (Step SA5).

In this way, in this embodiment, when the management board 26 and the printer board 27 are disconnected from each other, hi write start address data 67 or fiscal write start address data 68 stored in the SRAM 33 is erased. Meanwhile, as described above, when these kinds of data are erased, if the fiscal printer 1i is powered on, it is determined that there is an SRAM error, and the subsequent actuation of the fiscal printer 1i is stopped. Therefore, it is possible to obtain the same effects as those in the first embodiment.

As described above, the fiscal printer 1i of this embodiment includes the management-side connector 61 (detection section) which detects the disconnection between the management board 26 and the printer board 27, and the RTC 38 which, when it is detected that the management board 26 and the printer board 27 are disconnected from each other, erases data stored in the SRAM 33.

Accordingly, when the management board 26 and the printer board 27 are disconnected from each other, data, such as EJ write start address data 67 or fiscal write start address data 68 stored in the SRAM 33, is erased. For this reason, after the management board 26 and the printer board 27 are disconnected from each other, normal access to the EJ memory 34 or the like cannot be performed by the main control section 30 using data, such as EJ write start address data 67 or fiscal write start address data 68 stored in the SRAM 33, and on the basis of this situation, the main control section 30 can perform effective processing against falsification which is done after the management board 26 and the printer board 27 are disconnected from each other, such as stopping the actuation of the fiscal printer 1i after the management board 26 and the printer board 27 are disconnected from each other. In this case, an indication that an error or abnormality occurs may be displayed or notified. The trace of falsification is retained.

The above-described embodiments are just an illustrative embodiment of the invention, and modifications and applications may be arbitrarily made without departing from the scope of the invention.

Although in the above-described first embodiment, the invention has been described in connection with an example of the form of the power supply line 80, the form of the power supply line 80 is not limited thereto. For example, when the cover 22 is placed in the open state, the power supply line 80 may be mechanically shut off, and the power supply to the RTC 38 may be shut off. The same is applied to the power supply line 84 of the second embodiment.

Although in the above-described third embodiment, the positional relationship between various members, such as the battery 42, the management board 26, and the power supply line 80, has been described as an example, the positional relationship, the form, the configuration, and the like are not limited thereto. For example, when the management board 26 is detached from the housing box 16, the power supply from the battery 42 to the RTC 38 or the SRAM 33 may be shut off.

Although in the above-described fourth embodiment, the invention has been described in connection with an example of the form of the power supply line 86, the form of the power supply line 86 is not limited thereto. For example, when the management board 26 and the printer board 27 are disconnected from each other, the power supply line 86 may be mechanically shut off, and the power supply to the RTC 38 may be shut off. The same is applied to the power supply line 87 of the fifth embodiment.

In the above-described embodiments, for example, when data is written into the EJ memory 34 or the fiscal memory 37, the main control section 30 compares the date and time represented by the last write date-and-time data 66 stored in the ROM 32 with the date and time represented by data input from the RTC 38, and when the date and time represented by the last write date-and-time data 66 stored in the ROM 32 is temporally later than the date and time represented by data input from the RTC 38, determines that there is an RTC error and stops the actuation of the fiscal printer 1. Meanwhile, each time the fiscal printer 1 is powered on, the date and time represented by the last write date-and-time data 66 stored in the ROM 32 may be compared with the date and time represented by data input from the RTC 38, and when the date and time represented by the last write date-and-time data 66 stored in the ROM 32 is temporally later than the date and time represented by data input from the RTC 38, it may be determined that there is an RTC error, and the actuation of the fiscal printer 1 may be stopped.

In the sixth to ninth embodiments, when the cover 22 is placed in the open state or when the management board 26 and the printer board 27 are disconnected from each other, the main control section 30 may be kept to input a signal indicating the disconnection to a predetermined port. Each time the fiscal printer 1 is powered on, on the basis of the signal input to the port, the main control section 30 may detect that the cover 22 is placed in the open state or the management board 26 and the printer board 27 are disconnected from each other. On the basis of the detection result, current date-and-time data 74 stored in the RTC volatile storage section 71 of the RTC 38 may be erased, or data stored in the SRAM 33 may be erased, such that the actuation of the fiscal printer 1 may be stopped. With this configuration, it is possible to obtain the same effects as those in the above-described embodiments.

Some of the above-described first to ninth embodiments are suitably combined in a single fiscal printer.

What is claimed is:
1. An electronic apparatus, comprising:
a management board including:
 a control section;
 a real-time clock that outputs data indicating current date and time to the control section;
 a memory that stores fiscal data including the data indicating the current date and time and fiscal information under the control of the control section; and
 a power source that supplies power to the real-time clock through a power supply path; and
a housing box including a box main body and a cover, the housing box housing the management board,
wherein when the cover is in a closed state, the power supply path is formed and the power is supplied to the real-time clock, and
wherein when the cover is placed in an open state, the power supply path is irreversibly shut off and the power supplied to the real-time clock is shut off.
2. An electronic apparatus, comprising:
a management board including:
 a control section;
 a real-time clock that outputs data indicating current date and time to the control section;
 a memory that stores fiscal data including the data indicating the current date and time and fiscal information under the control of the control section;

a volatile memory that stores data for access to the memory by the control section; and a power source that supplies power to the volatile memory through a power supply path; and a housing box including a box main body and a cover, the housing box housing the management board, wherein when the cover is in a closed state, the power supply path is formed and the power is supplied to the volatile memory, and wherein when the cover is placed in an open state, the power supply path is shut off and the power supplied to the volatile memory is shut off.

3. An electronic apparatus, comprising:
a management board including:
   a control section;
   a real-time clock that outputs data indicating current date and time to the control section;
   a memory that stores fiscal data including the data indicating the current date and time and fiscal information under the control of the control section; and
   a power source that supplies power to the real-time clock through a power supply path; and
a housing box in which the management board is housed and attached,
wherein when the management board is attached to the housing box, the power supply path is formed and the power is supplied to the real-time clock, and
wherein when the management board is detached from the housing box, the power supply path is shut off and the power supplied to the real-time clock is shut off.

4. An electronic apparatus, comprising:
a management board including:
   a control section;
   a real-time clock that outputs data indicating current date and time to the control section;
   a memory that stores fiscal data including the data indicating the current date and time and fiscal information under the control of the control section;
   a volatile memory that stores data for access to the memory by the control section; and
   a power source that supplies power to the volatile memory through a power supply path; and
a housing box in which the management board is housed and attached,
wherein when the management board is attached to the housing box, the power supply path is formed and the power is supplied to the volatile memory, and
wherein when the management board is detached from the housing box, the power supply path is shut off and the power supplied to the volatile memory is shut off.

5. An electronic apparatus, comprising:
a management board including:
   a control section;
   a real-time clock that outputs data indicating current date and time to the control section;
   a memory that stores fiscal data including the data indicating the current date and time and fiscal information under the control of the control section; and
   a power source that supplies power to the real-time clock through a power supply path;
a printer; and
a printer board for the printer, connected to the management board,
wherein when the management board and the printer board are connected to each other, the power supply path is formed and the power is supplied to the real-time clock, and
wherein when the management board and the printer board are disconnected from each other, the power supply path is shut off and the power supplied to the real-time clock is shut off.

6. An electronic apparatus, comprising:
a management board including:
   a control section;
   a real-time clock that outputs data indicating current date and time to the control section;
   a memory that stores fiscal data including the data indicating the current date and time and fiscal information under the control of the control section;
   a volatile memory that stores data for access to the memory by the control section; and
   a power source that supplies power to the volatile memory through a power supply path;
a printer; and
a printer board for the printer, connected to the management board,
wherein when the management board and the printer board are connected to each other, the power supply path is formed and the power is supplied to the volatile memory, and
wherein when the management board and the printer board are disconnected from each other, the power supply path is formed and the power supplied to the volatile memory is shut off.

7. An electronic apparatus, comprising:
a management board including:
   a control section;
   a real-time clock that outputs data indicating current date and time to the control section; and
   a memory that stores fiscal data including the data indicating the current date and time and fiscal information under the control of the control section;
a housing box including a box main body and a cover, the housing box housing the management board;
a detection section that detects an open state of the cover; and
a reset section that erases the current date and time measured by the real-time clock when the detection section detects the open state of the cover.

8. The electronic apparatus as set forth in claim 7,
wherein the management board further includes a power source that supplies power to the real-time clock, and
wherein the reset section shuts off the power supplied from the power source to the real-time clock so as to erase the current date and time measured by the real-time clock when the detection section detects the open state of the cover.

9. The electronic apparatus as set forth in claim 8,
wherein a switch which is controlled by the real-time clock is provided in a power supply path connecting the power source and the real-time clock,
wherein when the detection section detects the open state of the cover, the detection section outputs a signal indicating the detection of the open state to the real-time clock, and
wherein when the signal is input to the real-time clock which functions as the reset section, the real-time clock controls the switch to shut off the power supplied from the power source to the real-time clock.

10. An electronic apparatus, comprising:
a management board including:
   a control section;
   a real-time clock that outputs data indicating current date and time to the control section; and a memory that stores fiscal data including the data indicating the current date and time and fiscal information under the control of the control section;
a printer;
a printer board for the printer, connected to the management board;
a detection section that detects that the management board and the printer board are disconnected from each other; and
a reset section that erases the current date and time measured by the real-time clock when the detection section detects that the management board and the printer board are disconnected from each other.

11. An electronic apparatus, comprising:
a management board including:
   a control section;
   a real-time clock that outputs data indicating current date and time to the control section;
   a memory that stores fiscal data including the data indicating the current date and time and fiscal information under the control of the control section; and
   a volatile memory that stores data for access to the memory by the control section;
a housing box including a box main body and a cover, the housing box housing the management board;
a detection section that detects an open state of the cover; and
a data erasure section that erases the data stored in the volatile memory when the detection section detects the open state of the cover.

12. The electronic apparatus as set forth in claim 11,
wherein the management board further includes a power source that supplies power to the volatile memory, and
wherein the data erasure section shuts off the power supplied from the power source to the volatile memory so as to erase the data stored in the volatile memory when the detection section detects the open state of the cover.

13. The electronic apparatus as set forth in claim 12,
wherein a switch which is controlled by the real-time clock is provided in a power supply path connecting the power source and the volatile memory,
wherein when the detection section detects the open state of the cover, the detection section outputs a signal indicating the detection of the open state to the real-time clock, and
wherein when the signal is input to the real-time clock which functions as the data erasure section, the real-time clock controls the switch to shut off the power supplied from the power source to the volatile memory.

14. An electronic apparatus, comprising:
a management board including:
   a control section;
   a real-time clock that outputs data indicating current date and time to the control section;
   a memory that stores fiscal data including the data indicating the current date and time and fiscal information under the control of the control section; and
   a volatile memory that stores data for access to the memory by the control section;
a printer;
a printer board for the printer, connected to the management board;
a detection section that detects that the management board and the printer board are disconnected from each other; and
a data erasure section that erases the data stored in the volatile memory when the detection section detects that the management board and the printer board are disconnected from each other.

15. A method of controlling an electronic apparatus which comprises:
a management board including:
   a control section;
   a real-time clock that outputs data indicating current date and time to the control section;
   a memory that stores fiscal data including the data indicating the current date and time and fiscal information under the control of the control section;
   a volatile memory that stores data for access to the memory by the control section; and
   a power source that supplies power to the real-time clock and the volatile memory; and
a housing box including a box main body and a cover, the housing box housing the management board, the method comprising:
when the cover is in a closed state, forming a power supply path to the real-time clock and the volatile memory to supply the power; and
when the cover is in an open state, shutting off the power supply path to at least one of the real-time clock and the volatile memory to shut off the power.

16. A method of controlling an electronic apparatus which comprises:
a management board including:
   a control section;
   a real-time clock that outputs data indicating current date and time to the control section;
   a memory that stores fiscal data including the data indicating the current date and time and fiscal information under the control of the control section;
   a volatile memory that stores data for access to the memory by the control section; and
   a power source that supplies power to the real-time clock and the volatile memory; and
a housing box in which the management board is housed and attached, the method comprising:
when the management board is attached to the housing box, forming a power supply path to the real-time clock and the volatile memory to supply the power; and
when the management board is detached from the housing box, shutting off the power supply path to at least one of the real-time clock and the volatile memory to erase at least one of the data indicating the current date and time and the data for access to the memory by the control section.

17. A method of controlling an electronic apparatus which comprises:
a management board including:
   a control section;
   a real-time clock that outputs data indicating current date and time to the control section;
   a memory that stores fiscal data including the data indicating the current date and time and fiscal information under the control of the control section;
   a volatile memory that stores data for access to the memory by the control section; and
   a power source that supplies power to the real-time clock and the volatile memory;
a printer;
a printer board for the printer, connected to the management board, the method comprising:

when the management board and the printer board are connected to each other, forming a power supply path to the real-time clock and the volatile memory to supply the power; and when the management board and the printer board are disconnected from each other, shutting off the power supply path to at least one of the real-time clock and the volatile memory to erase at least one of the data indicating the current date and time and the data for access to the memory by the control section.

18. A method of controlling an electronic apparatus, comprising:

using a processor, storing fiscal data including data indicating current date and time measured by a real-time clock and fiscal information, in a memory; and when an open state of a cover of a housing box which houses a management board with the memory mounted thereon is detected, erasing the current date and time of the real-time clock or erasing data for access to the memory, which is stored in a volatile memory.

19. A method of controlling an electronic apparatus, comprising:

using a processor, storing fiscal data including data indicating current date and time measured by a real-time clock and fiscal information, in a memory; and when it is detected that a management board with the memory mounted thereon is disconnected from a printer board for a printer, erasing the current date and time of the real-time clock or erasing data for access to the memory, which is stored in a volatile memory.

* * * * *